US012218725B2

(12) United States Patent
Ksairi et al.

(10) Patent No.: US 12,218,725 B2
(45) Date of Patent: Feb. 4, 2025

(54) DEVICES AND METHODS FOR ADAPTIVELY ADJUSTING A MIMO TRANSMISSION SCHEME

(71) Applicant: HUAWEI TECHNOLOGIES CO., LTD., Guangdong (CN)

(72) Inventors: Nassar Ksairi, Boulogne Billancourt (FR); Marios Kountouris, Boulogne Billancourt (FR); Jesus Arnau Yanez, Boulogne Billancourt (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 685 days.

(21) Appl. No.: 17/138,305

(22) Filed: Dec. 30, 2020

(65) Prior Publication Data
US 2021/0119679 A1   Apr. 22, 2021

Related U.S. Application Data

(63) Continuation of application No. PCT/EP2018/068378, filed on Jul. 6, 2018.

(51) Int. Cl.
*H04B 7/06* (2006.01)
*H04B 7/0452* (2017.01)
*H04B 7/0456* (2017.01)

(52) U.S. Cl.
CPC ......... *H04B 7/0626* (2013.01); *H04B 7/0452* (2013.01); *H04B 7/0456* (2013.01); *H04B 7/0617* (2013.01)

(58) Field of Classification Search
CPC .. H04B 7/0626; H04B 7/0452; H04B 7/0456; H04B 7/0617; H04B 7/0669;
(Continued)

(56) References Cited

U.S. PATENT DOCUMENTS

2005/0020237 A1   1/2005 Alexiou et al.
2008/0268862 A1   10/2008 Kent et al.
(Continued)

FOREIGN PATENT DOCUMENTS

CN   1728587 A   2/2006
CN   101385253 A   3/2009
(Continued)

OTHER PUBLICATIONS

Cheng et al., "Beamforming and Alamouti STBC combined downlink transmission schemes in communication systems for high-speed railway," 2013 International Conference on Wireless Communications and Signal Processing, Dec. 2, 2013, 6 pages.
(Continued)

*Primary Examiner* — Jung H Park
(74) *Attorney, Agent, or Firm* — Fish & Richardson P.C.

(57) ABSTRACT

The application relates to a user equipment for wireless communications with a multiple-input multiple-output (MIMO) base station over a wireless communications channel. The user equipment comprises a communications interface configured to receive a current pilot signal over the wireless communications channel from the base station, and at least one processor configured to determine a current channel state information (CSI) based on the current pilot signal and to determine a CSI reliability measure value based on the current CSI and one or several previous CSI, where the at least one processor is configured to determine the previous CSI based on previous pilot signals, i.e. previously received pilot signals.

18 Claims, 10 Drawing Sheets

(58) Field of Classification Search
CPC ... H04B 7/068; H04B 7/0689; H04L 25/0224; H04L 25/0204
See application file for complete search history.

(56) References Cited

U.S. PATENT DOCUMENTS

| | | | |
|---|---|---|---|
| 2010/0284484 A1 | 11/2010 | Ngren et al. | |
| 2012/0051451 A1* | 3/2012 | Kwon | H04L 5/0053 375/296 |
| 2012/0122407 A1 | 5/2012 | Allpress et al. | |
| 2012/0207243 A1 | 8/2012 | Koivisto et al. | |
| 2012/0250618 A1* | 10/2012 | Abraham | H04L 1/0026 370/328 |
| 2013/0044610 A1 | 2/2013 | Zhao et al. | |
| 2014/0029650 A1 | 1/2014 | Park et al. | |
| 2019/0363773 A1* | 11/2019 | Yerramalli | H04W 16/14 |
| 2020/0169364 A1* | 5/2020 | Hao | H04L 5/0055 |
| 2020/0382979 A1* | 12/2020 | Song | H04L 5/0094 |
| 2021/0250073 A1* | 8/2021 | Huang | H04W 72/569 |

FOREIGN PATENT DOCUMENTS

| | | |
|---|---|---|
| CN | 101388699 A | 3/2009 |
| CN | 102377540 A | 3/2012 |
| CN | 108141343 A | 6/2018 |
| WO | 2017049599 A1 | 3/2017 |

OTHER PUBLICATIONS

Jongren et al., "Combining Beamforming and Orthogonal Space—Time Block Coding," IEEE Transactions on Information Theory, vol. 48, No. 3, Mar. 2002, 17 pages.

PCT International Search Report and Written Opinion issued in International Application No. PCT/EP2018/068378 on Mar. 29, 2019, 15 pages.

Office Action issued in Chinese Application No. 201880094229.2 on Aug. 13, 2021, 30 pages (with English translation).

\* cited by examiner

DEVICES AND METHODS FOR ADAPTIVELY ADJUSTING A MIMO TRANSMISSION SCHEME

CROSS-REFERENCE TO RELATED APPLICATIONS

This application is a continuation of International Application No. PCT/EP2018/068378, filed on Jul. 6, 2018. The disclosure of which is hereby incorporated by reference in its entirety.

TECHNICAL FIELD

In general, the present application relates to the field of telecommunications. More specifically, the present application relates to devices and methods for adaptively adjusting a MIMO transmission scheme, in particular in wireless communication networks.

BACKGROUND

In a wireless multi-user access scenario where a base station needs to communicate with multiple user terminals (UTs) or user equipment (UE), special signals known by the terminals e.g., CSI-RS (channel state information reference signals) pilots in Long-Term Evolution (LTE) systems, are normally transmitted by the base station, so that the user terminals can generate channel state information (CSI) about the wireless links from the base station. These special signals are called cell specific reference signals (CRS). The channel state information (CSI) can be fed back to the base station to be used to take scheduling decisions for subsequent transmissions to the user terminals i.e., to determine which of them transmit or/and receive on which time-frequency radio resources.

Furthermore, if the base station has multiple antennas and channel state information (CSI) about the radio links from these antennas to the different user terminals in the cell area (the so-called closed-loop scenario), one practical downlink transmission scheme is multiple-input multiple-output (MIMO) linear precoding (often referred to as transmit beamforming) which consists in multiplying the data symbols to be transmitted with user- and antenna-dependent coefficients that are selected based on the channel state information (CSI) of the co-scheduled users, and then in adding or combining the resulting signals before passing them to the antenna array.

If the multi-antenna base station does not have the necessary CS (the so-called open-loop scenario). MIMO diversity schemes can be used instead. One example of such schemes is precoder cycling, where different MIMO precoders are selected from a predefined precoding codebook and are used on different resource units within the transmission bandwidth. Another example is space-time (or frequency) block coding (ST(F)BC) which, in its non-weighted version, does not require CSI knowledge at the transmitter. In practice, the base station does have CSI about the active user terminals (UTs), but this CSI is not always of enough quality for pure MIMO beamforming to be used e.g., partial CSI, delayed CSI, etc. In these cases, it is better to use schemes that combine MIMO beamforming and diversity. One example is precoder cycling where the used precoders are selected only from a subset of the codebook with this subset defined by a partial CSI. Another example is weighted ST(F)BC, where the ST(F)BC symbols codeword is precoded using a matrix determined by the delayed, and thus imperfect, CSI.

Another kind of downlink reference signals is downlink user-specific pilots, e.g., demodulation reference signals (DMRS) pilots in LTE and new radio (NR) systems. These pilots are sent by the base station along with data symbols in systems that employ downlink MIMO precoding and they pass through the same precoding that the base station applies to data symbols. That way, user terminals (UTs) can learn their respective effective downlink channels, i.e. the scalar channels that are experienced at the antenna elements of the user terminal as a result of applying spatial precoding at the base station. This knowledge of the effective downlink channels is necessary for equalization and coherent demodulation purposes at the user terminals. When the same precoder is used on several resource units, e.g., on a resource block group (RBG), joint channel estimation can typically be applied to obtain the estimate of the effective channels on these resource units with a better precision than the case where channel estimation is done separately on each resource unit.

One existing solution is weighted ST(F)BC as seen in G. Jongren et al. "Combining beamforming and orthogonal space-time block coding", in IEEE Trans. Inf. Theory, vol. 48, pp. 611-627, 2002, wherein the ST(F)BC codeword is precoded using a matrix determined by the delayed and thus imperfect CSI. More precisely, the precoding matrix is formed by a first precoding vector that is dictated by the latest (delayed) CSI feedback while the remaining precoding vectors are selected to be vectors orthogonal to the first vector. The power allocation to these different vectors is determined as function of the quality of the CSI feedback. However, no practical way of determining, reporting or signaling this CSI quality measure is provided.

Another solution that combines precoding and diversity is to precode the ST(F)BC codeword matrix using the strongest eigenvectors of the covariance matrix of the channel vector. The details about this method can be found in M. Cheng et al., "Beamforming and Alamouti STBC combined downlink transmission schemes in communication systems for high-speed railway", WCSP, Hangzhou China, 2013. However, this solution is more relevant for open-loop scenarios with no CSI feedback.

In the patent applications US 20100284484 A1 and US 20120207243 A1, only open-loop precoder cycling schemes are considered and there is thus no room to improve the transmission with partial or delayed CSI. In US 2014/0029650 A1, the subset of the precoding codebook that will be used for precoder cycling is adaptively modified based on how much time has passed since the last time the base station received CSI feedback from the user terminal. For instance, pure beamforming is used right after CSI feedback selection while precoder cycling is activated only after this feedback becomes outdated to a certain extent. However, this solution does not take into account the reliability/accuracy of the CSI feedback as received, since this feedback is typically based on an earlier downlink CRS transmission.

US 20130044610 A1 proposes a method to estimate the temporal correlation level of a wireless channel which is related to the mobility of the user terminal at the end of that channel, and to use this estimated value in order to decide whether to use closed-loop MIMO precoding schemes or open-loop MIMO diversity schemes.

However, this estimation is based on uplink sounding reference signals (SRS) and cannot thus be directly mapped to the actual CRS based downlink CSI quality even in systems with uplink-downlink channel reciprocity (uplink SRS transmission and downlink CRS transmission do not necessarily have the same periodicity).

Moreover, the thus obtained temporal correlation estimate only allows to switch between open-loop and closed-loop schemes but not to adaptively adjust the balance between them in a mixed scheme.

Tracking the value of the channel quality indicator (CQI) feedback for closed-loop MIMO systems, as can be found in US 20080268862 A1 and WO 2017049599 A1, could provide a way to estimate the quality of CSI that was used to generate the precoders that led to these CQI values. However, this potentiality was not developed yet and is not exploited to control mixed open-loop and closed-loop transmissions.

Thus, in light of the above there is a need for an improved user equipment and base station as well as corresponding methods, allowing determining a MIMO transmission scheme in an adaptive manner based in part on a measure of the CSI reliability/precision i.e., a quantitative indication of how close the latest available CSI is to the actual channel at the time of transmission.

SUMMARY

It is an object of the application to provide improved devices and methods for adaptively adjusting a MIMO transmission scheme in a wireless communication network.

The foregoing and other objects are achieved by the subject matter of the independent claims. Further implementation forms are apparent from the dependent claims, the description and the figures.

Generally, embodiments of the application relate to a user equipment (UE) and base station as well as corresponding methods to estimate a reliability measure of channel state information (CSI) quality and to use this measure in order to calculate the weights given to different MIMO precoding beams used for transmission. More specifically, the CSI reliability measure allows to calculate these weights in a way to balance between pure MIMO beamforming (only the beams/precoders corresponding to the CSI feedback are used since this feedback is considered to define a preferred direction in space) and MIMO diversity (there is no preferred spatial direction so that different beams/precoders are used on different resource units using schemes such as precoder cycling or on the same resource units with equal weights using ST(F)BC).

In this context, MIMO transmission schemes are designed by combining MIMO beamforming and MIMO diversity in a balanced manner which can be adaptively adjusted as function of the level of accuracy or reliability of the CSI available to the transmitter. The embodiments of the application also address the problem of computing, processing and signaling metrics of CSI reliability/accuracy that can be used to control the above mentioned tradeoff. This is particularly relevant for scenarios where pure MIMO beamforming or pure MIMO diversity cannot each by itself achieve the required target performance.

While some of the embodiments of the application use different pre-coders on resource blocks (RBs) belonging to the same resource block group (RBG), these pre-coders are derived from the same vector by only applying different scalar scalings of it. Joint effective channel estimation within a RBG based on DMRS pilots can thus still be applied provided that these scalar weights are signaled by the base station using a downlink signaling channel.

More specifically, according to a first aspect the application relates to a user equipment for wireless communications with a multiple-input multiple-output, MIMO, base station over a wireless communications channel, wherein the user equipment comprises: a communications interface configured to receive a current pilot signal over the wireless communications channel from the base station; and a processor configured to determine a current channel state information, CSI, on the basis of the current pilot signal and to determine a CSI reliability measure value on the basis of the current CSI and one or several previous CSI, wherein the processor is configured to determine the previous CSI on the basis of previous pilot signals, i.e. previously received pilot signals.

Thus, an improved user equipment is provided, which allows achieving better CSI reliability evaluation and reporting.

In a further possible implementation form of the first aspect, the communications interface is further configured to transmit the CSI reliability measure value to the base station for allowing the base station to determine a precoding-diversity weighting factor on the basis of the CSI reliability measure value and optionally an Signal To Noise Ratio (SNR) value, the number of base station antennas and/or the number of user equipment antennas and/or other system and link parameters, wherein the precoding-diversity weighting factor allows the base station to adaptively adjust a MIMO transmission scheme for data to be transmitted to the user equipment by weighting a beamforming precoding component and a diversity precoding component of the MIMO transmission scheme.

Thus, adjusting MIMO transmission scheme can be performed in an adaptive manner for data transmission in a communication network.

In a further possible implementation form of the first aspect, the processor is further configured to determine a precoding-diversity weighting factor on the basis of the CSI reliability measure value and optionally a SNR value, the number of base station antennas and/or the number of user equipment antennas and wherein the communications interface is configured to transmit the precoding-diversity weighting factor to the base station, wherein the precoding-diversity weighting factor allows the base station to adaptively adjust a MIMO transmission scheme for data to be transmitted to the user equipment by weighting a beamforming precoding component and a diversity precoding component of the MIMO transmission scheme.

In a further possible implementation form of the first aspect, the processor is configured to determine the precoding-diversity weighting factor on the basis of the CSI reliability measure value by using a scenario specific mapping between the CSI reliability measure value and the precoding-diversity weighting factor.

In a further possible implementation form of the first aspect, the processor is configured to determine the precoding-diversity weighting factor $\theta$ on the basis of the CSI reliability measure value $\rho$ by using the scenario specific mapping between the CSI reliability measure value and the precoding-diversity weighting factor defined by the following equation:

$$\theta = (1 - 1/T)\rho + 1/T,$$

wherein T denotes a system parameter integer value $\geq 2$.

In a further possible implementation form of the first aspect, the processor is configured to determine the CSI reliability measure values corresponding to different CSI delay values $\Delta_{CSI}$ as a correlation coefficient between the current channel estimate or the current CSI and a previous CSI separated by an amount of time equal to $\Delta_{CSI}$ from the current channel estimate or the current CSI.

In a further possible implementation form of the first aspect, the processor is configured to determine the CSI reliability measure value $\rho(\Delta_{CSI}, \text{new})$ corresponding to the CSI delay $\Delta_{CSI}$ on the basis of the following equation:

$$\rho(\Delta_{CSI}, \text{new}) = \alpha \frac{\hat{h}_{t-\Delta_{CSI}}^H h_t}{\|\hat{h}_{t-\Delta_{CSI}}\| \|h_t\|} + (1-\alpha)\rho(\Delta_{CSI}, \text{old}),$$

wherein $\|X\|$ for some vector of matrix X stands for the value of a norm of X, $\Delta_{CSI}$ denotes the time delay between the reception of the previous pilot signal and the current pilot signal by the communications interface, $\alpha$ denotes an averaging coefficient in the range from 0 to 1, $h_t$ denotes the vectorized form of the current channel response estimate, $\hat{h}_{t-\Delta_{CSI}}^H$ denotes the conjugate transpose of the vectorized form of a quantized previous channel response estimate and $\beta(\Delta_{CSI}, \text{old})$ denotes a previous CSI reliability measure value corresponding to CSI delay $\Delta_{CSI}$.

In a further possible implementation form of the first aspect, the processor is configured to determine the CSI reliability measure value $\rho(\Delta_{CSI}, \text{new})$ corresponding to the CSI delay $\Delta_{CSI}$ on the basis of the following equation:

$$\rho(\Delta_{CSI}, \text{new}) = \alpha \frac{\hat{h}_{t-\Delta_{CSI}}^H \hat{h}_t}{\|\hat{h}_{t-\Delta_{CSI}}\| \|\hat{h}_t\|} + (1-\alpha)\rho(\Delta_{CSI}, \text{old}),$$

wherein $\Delta_{CSI}$ denotes the time delay between the reception of the previous pilot signal and the current pilot signal by the communications interface, $\alpha$ denotes an averaging coefficient in the range from 0 to 1, $\hat{h}_t$ denotes the conjugate transpose of the vectorized form of a quantized current channel response estimate. $\hat{h}_{t-\Delta_{CSI}}^H$ denotes the vectorized form of a quantized previous channel response estimate and $\rho(\Delta_{CSI}, \text{old})$ denotes a previous CSI reliability measure value corresponding to CSI delay $\Delta_{CSI}$.

In a further possible implementation form of the first aspect, the processor is configured to store the value of $\rho(\Delta_{CSI}, \text{new})$ in an initially empty table whose first column is composed of the CSI delay values $\Delta_{CSI}$ that have been treated so far by the user equipment and whose second column is composed of the CSI reliability measure values corresponding to the CSI delay values of the first column.

In a further possible implementation form of the first aspect, the processor is configured to read the value of $\rho(\Delta_{CSI}, \text{old})$ from the table if the entry $(\Delta_{CSI}, \rho(\Delta_{CSI}))$ already exists in said table, or as a first alternative to assume a default value for $\rho(\Delta_{CSI}, \text{old})$ e.g. 0.5, or as a second alternative to use an interpolated value based on existing entries from the table e.g.

$$\rho(\Delta_{CSI}, \text{old}) = \frac{\Delta_{CSI} - \Delta_{CSI,1}}{\Delta_{CSI,2} - \Delta_{CSI,1}} \rho(\Delta_{CSI,1}) + \frac{\Delta_{CSI,2} - \Delta_{CSI}}{\Delta_{CSI,2} - \Delta_{CSI,1}} \rho(\Delta_{CSI,2})$$

where $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \Delta_{CSI} \leq \Delta_{CSI,2}$.

According to a second aspect the application relates to a corresponding method of operating a user equipment for wireless communications with a base station over a wireless communications channel, wherein the method comprises: receiving a current pilot signal over the wireless communications channel from the base station; determining a current channel response estimate on the basis of the current pilot signal; determining a current channel state information, CSI, on the basis of current channel response estimate: and determining a CSI reliability measure value on the basis of the current channel estimate or the latest available CSI and a previous CSI, wherein the previous CSI is determined on the basis of a previous pilot signal, i.e. previously received pilot signal.

The method according to the second aspect of the application can be performed by the user equipment according to the first aspect of the application. Further features of the method according to the second aspect of the application result directly from the functionality of the user equipment according to the first aspect of the application and its different implementation forms described above.

Thus, an improved method is provided, which allows achieving better CSI reliability evaluation and reporting.

According to a third aspect the application relates to a MIMO base station for wireless communications with a user equipment over a wireless communications channel, wherein the MIMO base station comprises: a processor configured to apply an adaptively adjustable MIMO transmission scheme to data to be transmitted to the user equipment; and a communications interface, including a plurality of antennas, wherein the communications interface is configured to send one or more pilot signals to the user equipment and to receive feedback from the user equipment, including or based on a channel state information, CSI, reliability measure value, the CSI delay $\Delta_{CSI}$ to which the reliability measure corresponds, wherein the CSI reliability measure value is based on a current channel estimate or latest CSI and a previous CSI determined by the user equipment on the basis of a respective pilot signal; wherein the processor is further configured to adaptively adjust the MIMO transmission scheme on the basis of the CSI feedback and CSI reliability measure value and corresponding CSI delay value feedback from the user equipment.

Thus, an improved MIMO base station is provided which allows adjusting the MIMO transmission scheme for data transmission in a wireless communication in an adaptive manner based in part on a measure of the CS reliability/precision.

In a further possible implementation form of the third aspect, the feedback from the user equipment comprises the channel state information. CSI, reliability measure value and the CSI delay $\Delta_{CSI}$ to which the reliability measure corresponds and wherein the processor is configured to determine a precoding-diversity weighting factor on the basis of the CSI reliability measure value and optionally a SNR value, the number of base station antennas and/or the number of user equipment antennas, wherein the processor is further configured to adaptively adjust the MIMO transmission scheme by weighting a beamforming precoding component and a diversity precoding component of the MIMO transmission scheme on the basis of the precoding-diversity weighting factor.

In a further possible implementation form of the third aspect, the processor is configured to determine the precoding-diversity weighting factor on the basis of the CSI reliability measure value by using a scenario specific mapping between the CSI reliability measure value and the precoding-diversity weighting factor.

In a further possible implementation form of the third aspect, the processor is configured to determine the precoding-diversity weighting factor θ on the basis of the CSI delay value $\tilde{\Delta}_{CSI}$ and a table by using the scenario specific mapping between the CSI reliability measure value and the precoding-diversity weighting factor defined by the following equations:

$$\theta = (1-1/T)\rho(\tilde{\Delta}_{CSI}) + 1/T,$$

$$\tilde{\Delta}_{CSI} = \Delta_{CSI} + t_{Tr} - t_{CSI},$$

wherein T denotes a system parameter integer value ≥2, $\Delta_{CSI}$ denotes the time delay between the reception of the previous pilot signal and the current pilot signal by the user equipment, $t_{Tr}$ denotes the moment of transmission and $t_{CSI}$ denotes the moment of reception of the feedback from the user equipment and $\rho(\tilde{\Delta}_{CSI})$ is obtained from the table by reading the entry $(\tilde{\Delta}_{CSI}, \rho(\tilde{\Delta}_{CSI}))$ if it already exists in the table, or as a first alternative to assume a default value for $\rho(\tilde{\Delta}_{CSI})$ e.g. 0.5, or as a second alternative to use an interpolated value based on existing entries from the table e.g.

$$\rho(\tilde{\Delta}_{CSI}) = \frac{\tilde{\Delta}_{CSI} - \Delta_{CSI,1}}{\Delta_{CSI,2} - \Delta_{CSI,1}}\rho(\Delta_{CSI,1}) + \frac{\Delta_{CSI,2} - \tilde{\Delta}_{CSI}}{\Delta_{CSI,2} - \Delta_{CSI,1}}\rho(\Delta_{CSI,2})$$

where $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \tilde{\Delta}_{CSI} \leq \Delta_{CSI,2}$.

In a further possible implementation form of the third aspect, the communications interface is configured to transmit the precoding-diversity weighting factor determined by the processor to the user equipment.

In a further possible implementation form of the third aspect, the feedback from the user equipment comprises a precoding-diversity weighting factor based on the channel state information, CSI, reliability measure value and wherein the processor is configured to adaptively adjust the MIMO transmission scheme by weighting a beamforming precoding component and a diversity precoding component of the MIMO transmission scheme on the basis of the precoding-diversity weighting factor.

In a further possible implementation form of the third aspect, the feedback from the user equipment comprises precoding information derived from a precoding-diversity weighting factor based on the channel state information, CSI, reliability measure value and wherein the processor is configured to adaptively adjust the MIMO transmission scheme by weighting a beamforming precoding component and a diversity precoding component of the MIMO transmission scheme on the basis of the precoding information reported in the user equipment feedback.

In a further possible implementation form of the third aspect, the adaptively adjustable MIMO transmission scheme is a precoded space time/frequency block coding scheme associated with a space time/frequency block coding matrix and wherein the processor is configured to adaptively adjust the MIMO transmission scheme by weighting the columns or rows of the space time/frequency block coding matrix on the basis of the precoding-diversity weighting factor.

In a further possible implementation form of the third aspect, the communications interface is configured to transmit the data to the user equipment using a plurality of resource elements/blocks $\{1, \ldots, B\}$ and wherein the processor is configured to derive a plurality of weights $\{\theta_b\}_{b=1 \ldots B}$ on the basis of the precoding-diversity weighting factor θ to adaptively adjust the MIMO transmission scheme by weighting the columns or rows of the space time/frequency block coding matrix used for data transmission on the plurality of resource elements/blocks.

In a further possible implementation form of the third aspect, the plurality of weights $\{\theta_b\}_{b=1 \ldots B}$ is derived from the precoding-diversity weighting factor θ using one of the following equations: $\theta_b = \theta \mp t_b$ or $\theta_b = (1 \mp \delta_b) \times \theta$, where $0 \leq t_b \leq 1$ and $0 \leq \delta_b \leq 1$ are scenario dependent.

In a further possible implementation form of the third aspect, the processor is configured to determine the weighting of the columns or rows of the space time/frequency block coding matrix on the basis of the following equations:

$$W_b(\theta_b) = \tilde{W} D(\theta_b),$$

$$\tilde{W} = [\hat{g}_1 \; \hat{g}_2 \; \ldots \; \hat{g}_T],$$

$$D(\theta_b) = \text{diag}\left(\sqrt{\theta_b}, \sqrt{\frac{1-\theta_b}{T-1}}, \ldots, \sqrt{\frac{1-\theta_b}{T-1}}\right)$$

wherein $\theta_b$ denotes the precoding-diversity weighting factor [for a resource element/block b], $\tilde{W}$ is a MIMO precoding matrix whose columns $\hat{g}_1, \hat{g}_2, \ldots, \hat{g}_T$ are MIMO precoding vectors determined on the basis of CSI and $D(\theta_b)$ is a diagonal matrix that gives different weights to vectors $\hat{g}_1, \hat{g}_2, \ldots, \hat{g}_T$ on the basis of the value of $\theta_b$.

In a further possible implementation form of the third aspect, the communications interface is configured to transmit the data to the user equipment using a plurality of resource elements/blocks and a plurality of MIMO precoding vectors/matrices wherein the processor is configured to apply to each member of the plurality of resource elements/blocks one of the vectors/matrices of the plurality of precoding vectors/matrices, and wherein the processor is configured to adaptively adjust the percentage of resource elements/blocks to which each one of the plurality of precoding vectors/matrices is applied on the basis of the CSI reliability measure value θ.

In a further possible implementation form of the third aspect, the processor is configured to extract the respective precoding vector/matrix from [a subset of cardinality T of] a predefined MIMO transmission codebook, and wherein one of these vectors/matrices is used for data transmission on a portion of 100×θ% of the plurality of resource elements/blocks whereas the remaining T−1 vectors/matrices are used for data transmission on the remaining 100×(1−θ)% of the plurality of resource elements/blocks.

According to a fourth aspect the application relates to a corresponding method of operating a MIMO base station for wireless communications with a user equipment over a wireless communications channel, wherein the method comprises; sending one or more pilot signals to the user equipment: receiving feedback from the user equipment, including or based on a channel state information, CSI, reliability measure value, wherein the CSI reliability measure value is based on a current CSI and a previous CSI determined by the user equipment on the basis of a respective pilot signal;

adaptively adjusting a MIMO transmission scheme for data to be transmitted to the user equipment on the basis of the feedback from the user equipment; and applying the adaptively adjusted MIMO transmission scheme to the data and to some of the reference signals to be transmitted to the user equipment.

The method according to the fourth aspect of the application can be performed by the MIMO base station according to the third aspect of the application. Further features of the method according to the fourth aspect of the application result directly from the functionality of the MIMO base station according to the third aspect of the application and its different implementation forms described above.

Thus, an improved method of operating a MIMO base station is provided which allows adjusting the MIMO transmission scheme for data transmission in a wireless communication in an adaptive manner based in part on a measure of the CSI reliability/precision.

According to a fifth aspect the application relates to a computer program product comprising program code for performing the method of the second or the fourth aspect of the application, when executed on a computer or a processor.

The application can be implemented in hardware and/or software.

BRIEF DESCRIPTION OF THE DRAWINGS

Further embodiments of the application will be described with respect to the following figures, wherein.

In the various figures, identical reference signs will be used for identical or at least functionally equivalent features.

DETAILED DESCRIPTION OF EMBODIMENTS

In the following description, reference is made to the accompanying drawings, which form part of the disclosure, and in which are shown, by way of illustration, specific aspects in which the present application may be placed. It will be appreciated that other aspects may be utilized and structural or logical changes may be made without departing from the scope of the present application. The following detailed description, therefore, is not to be taken in a limiting sense, as the scope of the present application is defined by the appended claims.

For instance, it will be appreciated that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures.

Moreover, in the following detailed description as well as in the claims embodiments with different functional blocks or processing units are described, which are connected with each other or exchange signals. It will be appreciated that the present application covers embodiments as well, which include additional functional blocks or processing units that are arranged between the functional blocks or processing units of the embodiments described below.

Finally, it is understood that the features of the various exemplary aspects described herein may be combined with each other, unless specifically noted otherwise.

Figure 1:
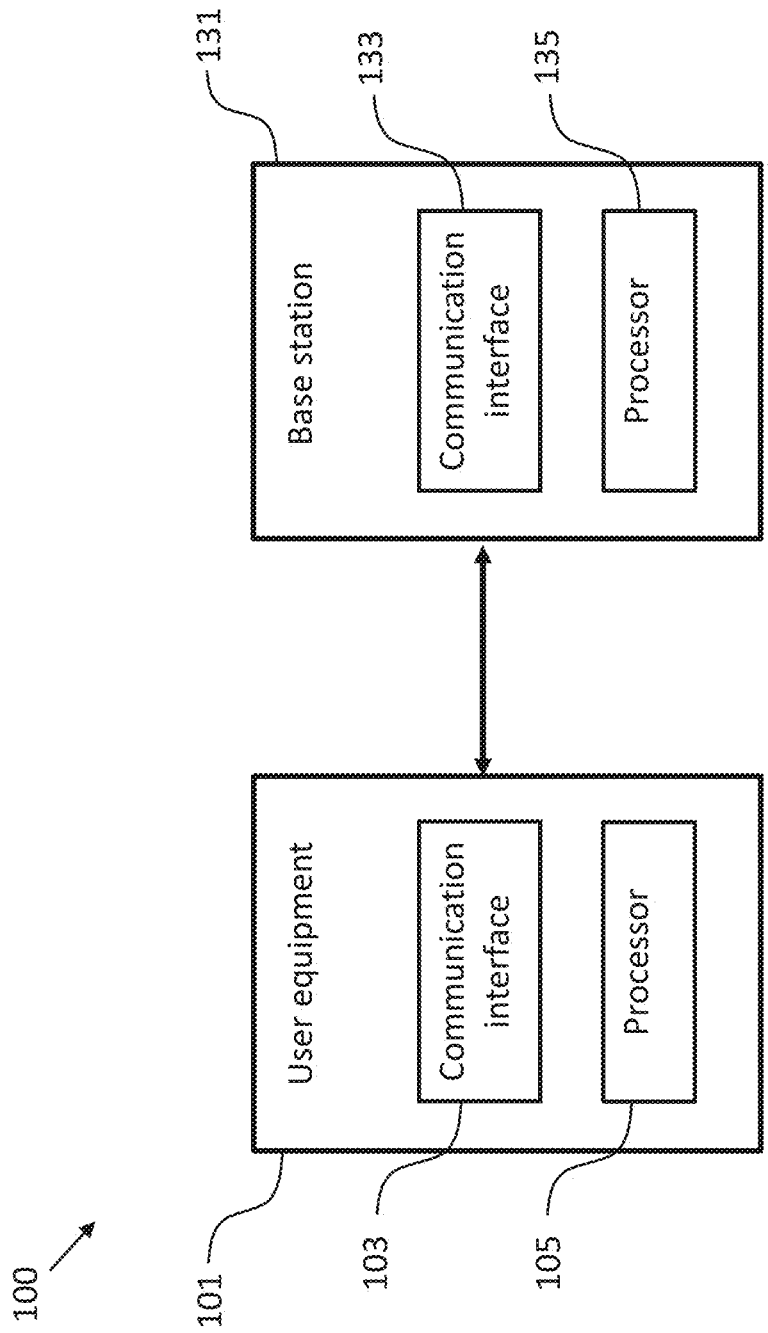
FIG. 1 shows a schematic diagram of a user equipment according to an embodiment in communication with a MIMO base station according to an embodiment.

FIG. 1 shows a communication system 100 comprising a communication device 101 according to an embodiment and a communication device 131 according to an embodiment configured to communicate via a wireless communication channel. In the following the communication device 101 will be also referred to as a user equipment 101 and the communication device 131 will be also referred to as a multiple-input multiple-output, MIMO, base station 131. In an embodiment, the communication system 100 can be a wireless communication system 100.

As can be taken from FIG. 1 and as will be described in more detail further below, the user equipment 101 comprises a communication interface 103 configured to receive a current pilot signal over the wireless communication channel from the base station 131. In an embodiment, the communication interface 103 of the user equipment 101 can comprise one or more antennas.

Furthermore, the user equipment 101 comprises a processor 105 configured to determine a current channel state information, CSI, on the basis of the current pilot signal and to determine a CSI reliability measure value on the basis of the current CSI and one or several previous CSI, wherein the processor 105 is configured to determine the previous CSI on the basis of previous pilot signals, i.e. previously received pilot signals.

As can be taken from FIG. 1 and as will be described in more detail further below, the base station 131 comprises a communication interface 133 configured to send one or more pilot signals to the user equipment 101 and to receive feedback from the user equipment 101, including or based on a channel state information, CSI, reliability measure value, the CSI delay $\Delta_{CSI}$ to which the reliability measure corresponds. In an embodiment, the communication interface 133 of the base station 131 can comprise one or more antennas. In an embodiment, the communication interface 133 is a MIMO communication interface 133.

Furthermore, the base station 131 comprises a processor 135 configured to apply an adaptively adjustable MIMO transmission scheme to data to be transmitted to the user equipment 101. The processor 135 is further configured to adaptively adjust the MIMO transmission scheme on the basis of the CSI feedback and CSI reliability measure value and corresponding CSI delay value feedback from the user equipment 101.

In an embodiment, the CSI reliability measure value is based on a current channel estimate or latest CSI and a previous CSI determined by the user equipment 101 on the basis of a respective pilot signal. In a further embodiment, the adaptively adjustable MIMO transmission scheme is a precoded space time/frequency block coding scheme associated with a space time/frequency block coding matrix and the processor 135 is configured to adaptively adjust the MIMO transmission scheme by weighting the columns or rows of the space time/frequency block coding matrix on the basis of a precoding-diversity weighting factor, as will be further discussed below.

According to an embodiment, either the user equipment 101 or the base station 131 can determine a precoding-diversity weighting factor on the basis of the CSI reliability measure value and optionally a SNR value, the number of base station antennas and/or the number of user equipment antennas, wherein the precoding-diversity weighting factor allows the base station 131 to adaptively adjust a MIMO transmission scheme for data to be transmitted to the user equipment 101 by weighting a beamforming precoding component and a diversity precoding component of the MIMO transmission scheme.

In an embodiment, the precoding-diversity weighting factor θ can be determined by the processor 105 of the user equipment 101 on the basis of the CSI reliability measure value ρ by using the scenario specific mapping between the CSI reliability measure value and the precoding-diversity weighting factor defined by the following equation.

$$\theta = (1-1/T)\rho + 1/T,$$

wherein T denotes a system parameter integer value ≥2.

Furthermore, the CSI reliability measure values can be determined by the processor 105 of the user equipment 101 corresponding to different CSI delay values $\Delta_{CSI}$ as a correlation coefficient between the current channel estimate or the current CSI and a previous CSI separated by an amount of time equal to $\Delta_{CSI}$ from the current channel estimate or the current CSI, wherein the CSI reliability measure value $\rho(\Delta_{CSI}, \text{new})$ corresponding to the CSI delay $\Delta_{CSI}$ can be determined on the basis of the following equation:

$$\rho(\Delta_{CSI}, \text{new}) = \alpha \frac{\hat{h}_{t-\Delta_{CSI}}^H h_t}{\|\hat{h}_{t-\Delta_{CSI}}\| \|h_t\|} + (1-\alpha)\rho(\Delta_{CSI}, \text{old}) \text{ or}$$

$$\rho(\Delta_{CSI}, \text{new}) = \alpha \frac{\hat{h}_{t-\Delta_{CSI}}^H \hat{h}_t}{\|\hat{h}_{t-\Delta_{CSI}}\| \|\hat{h}_t\|} + (1-\alpha)\rho(\Delta_{CSI}, \text{old}),$$

wherein $\|X\|$ for some vector of matrix X stands for the value of a norm of X, $\Delta_{CSI}$ denotes the time delay between the reception of the previous pilot signal and the current pilot signal by the communications interface, α denotes an averaging coefficient in the range from 0 to 1, $h_t$ or $\hat{h}_t$ denotes the vectorized form of a current channel response estimate or a quantized current channel response estimate, $\hat{h}_{t-\Delta_{CSI}}^H$, denotes the vectorized form of a quantized previous channel response estimate and $\rho(\Delta_{CSI}, \text{old})$ denotes a previous CSI reliability measure value corresponding to CSI delay $\Delta_{CSI}$.

According to an embodiment, the processor 105 of the user equipment 101 is configured to store the value of $\rho(\Delta_{CSI}, \text{new})$ in an initially empty table whose first column is composed of the CSI delay values $\Delta_{CSI}$ that have been treated so far by the user equipment 101 and whose second columns is composed of the CSI reliability measure values corresponding to the CSI delay values of the first column.

Furthermore, the processor 105 of the user equipment 101 is configured to read the value of $\rho(\Delta_{CSI}, \text{old})$ from the table if the entry $(\Delta_{CSI}, \rho(\Delta_{CSI}))$ already exists in said table, or as a first alternative to assume a default value for $\rho(\Delta_{CSI}, \text{old})$ e.g. 0.5, or as a second alternative to use an interpolated value based on existing entries from the table e.g.

$$\rho(\Delta_{CSI}, \text{old}) = \frac{\Delta_{CSI} - \Delta_{CSI,1}}{\Delta_{CSI,2} - \Delta_{CSI,1}} \rho(\Delta_{CSI,1}) + \frac{\Delta_{CSI,2} - \Delta_{CSI}}{\Delta_{CSI,2} - \Delta_{CSI,1}} \rho(\Delta_{CSI,2})$$

where $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \Delta_{CSI} \leq \Delta_{CSI,2}$.

At the base station 131, according to an embodiment, the processor 135 is configured to determine the precoding-diversity weighting factor θ on the basis of the CSI delay value $\Delta_{CSI}$ and the table mentioned above by using the scenario specific mapping between the CSI reliability measure value and the precoding-diversity weighting factor defined by the following equations:

$$\theta = (1-1/T)\rho(\tilde{\Delta}_{CSI}) + 1/T,$$

$$\tilde{\Delta}_{CSI} = \Delta_{CSI} + t_{Tr} - t_{CSI},$$

wherein T denotes a system parameter integer value ≥2, $\Delta_{CSI}$ denotes the time delay between the reception of the previous pilot signal and the current pilot signal by the user equipment 101, $t_{Tr}$ denotes the moment of transmission and $t_{CSI}$ denotes the moment of reception of the feedback from the user equipment 101 and $\rho(\tilde{\Delta}_{CSI})$ is obtained from the above table by reading the entry $(\tilde{\Delta}_{CSI}, \rho(\tilde{\Delta}_{CSI}))$ if it already exists in the table, or as a first alternative to assume a default value for $\rho(\tilde{\Delta}_{CSI})$ e.g. 0.5, or as a second alternative to use an interpolated value based on existing entries from the table e.g.

$$\rho(\tilde{\Delta}_{CSI}) = \frac{\tilde{\Delta}_{CSI} - \Delta_{CSI,1}}{\Delta_{CSI,2} - \Delta_{CSI,1}} \rho(\Delta_{CSI,1}) + \frac{\Delta_{CSI,2} - \tilde{\Delta}_{CSI}}{\Delta_{CSI,2} - \Delta_{CSI,1}} \rho(\Delta_{CSI,2})$$

where $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \tilde{\Delta}_{CSI} \leq \Delta_{CSI,2}$.

In an embodiment, the processor 135 of the base station 131 is configured to adaptively adjust the MIMO transmission scheme by weighting a beamforming precoding component and a diversity precoding component of the MIMO transmission scheme on the basis of the precoding-diversity weighting factor.

Alternatively, the communications interface 133 of the base station 131 can receive feedback from the user equipment 101 and the feedback from the user equipment 101 comprises a precoding-diversity weighting factor based on the channel state information, CSI, reliability measure value. The processor 135 of the base station 131 is configured to adaptively adjust the MIMO transmission scheme by weighting a beamforming precoding component and a diversity precoding component of the MIMO transmission scheme on the basis of the precoding-diversity weighting factor.

In a further embodiment, the feedback from the user equipment 101 comprises precoding information derived from a precoding-diversity weighting factor based on the channel state information, CSI, reliability measure value and the processor 135 of the base station 131 is configured to adaptively adjust the MIMO transmission scheme by weighting a beamforming precoding component and a diversity precoding component of the MIMO transmission scheme on the basis of the precoding information reported in the user equipment feedback.

In an embodiment, the communications interface 133 of the base station 131 is configured to transmit the data to the user equipment 101 using a plurality of resource elements/blocks $\{1, \ldots, B\}$ and the processor 135 of the base station 131 is configured to derive a plurality of weights $\{\theta_b\}_{b=1 \ldots B}$ on the basis of the precoding-diversity weighting factor $\theta$ to adaptively adjust the MIMO transmission scheme by weighting the columns or rows of the space time/frequency block coding matrix used for data transmission on the plurality of resource elements/blocks, wherein the plurality of weights $\{\theta_b\}_{b=1 \ldots B}$ are derived from the precoding-diversity weighting factor $\theta$ using one of the following equations: $\theta_b = \theta \mp t_b$, or $\theta_b = (1 \mp \delta_b) \times \theta$, where $0 \le t_b \le 1$ and $0 \le \delta_b \le 1$ are scenario dependent.

More specifically, the weighting of the columns or rows of the space time/frequency block coding matrix can be determined on the basis of the following equations:

$$W_b(\theta_b) = \tilde{W} D(\theta_b),$$

$$\tilde{W} = [\hat{g}_1 \ \hat{g}_2 \ \ldots \ \hat{g}_T],$$

$$D(\theta_b) = \operatorname{diag}\left(\sqrt{\theta_b}, \sqrt{\frac{1-\theta_b}{T-1}}, \ldots, \sqrt{\frac{1-\theta_b}{T-1}}\right)$$

wherein $\theta_b$ denotes the precoding-diversity weighting factor [for a resource element/block b], $\tilde{W}$ is a MIMO precoding matrix whose columns $\hat{g}_1, \hat{g}_2, \ldots, \hat{g}_T$ are MIMO precoding vectors determined on the basis of CSI and $D(\theta_b)$ is a diagonal matrix that gives different weights to vectors $\hat{g}_1, \hat{g}_2, \ldots, \hat{g}_T$ on the basis of the value of $\theta_b$.

In a further embodiment, the base station 131 can transmit the data to the user equipment 101 using a plurality of resource elements/blocks and a plurality of MIMO precoding vectors/matrices, and the processor 135 of the base station 131 is configured to apply to each member of the plurality of resource elements/blocks one of the vectors/matrices of the plurality of precoding vectors/matrices and to adaptively adjust the percentage of resource elements/blocks to which each one of the plurality of precoding vectors/matrices is applied on the basis of the CSI reliability measure value $\theta$.

In a further embodiment, the processor 135 of the base station 131 is configured to extract the respective precoding vector/matrix from a subset of cardinality T of a predefined MIMO transmission codebook, and one of these vectors/matrices is used for data transmission on a portion of 100×$\theta$% of the plurality of resource elements/blocks whereas the remaining T−1 vectors/matrices are used for data transmission on the remaining 100×(1−$\theta$)% of the plurality of resource elements/blocks.

Figure 2:
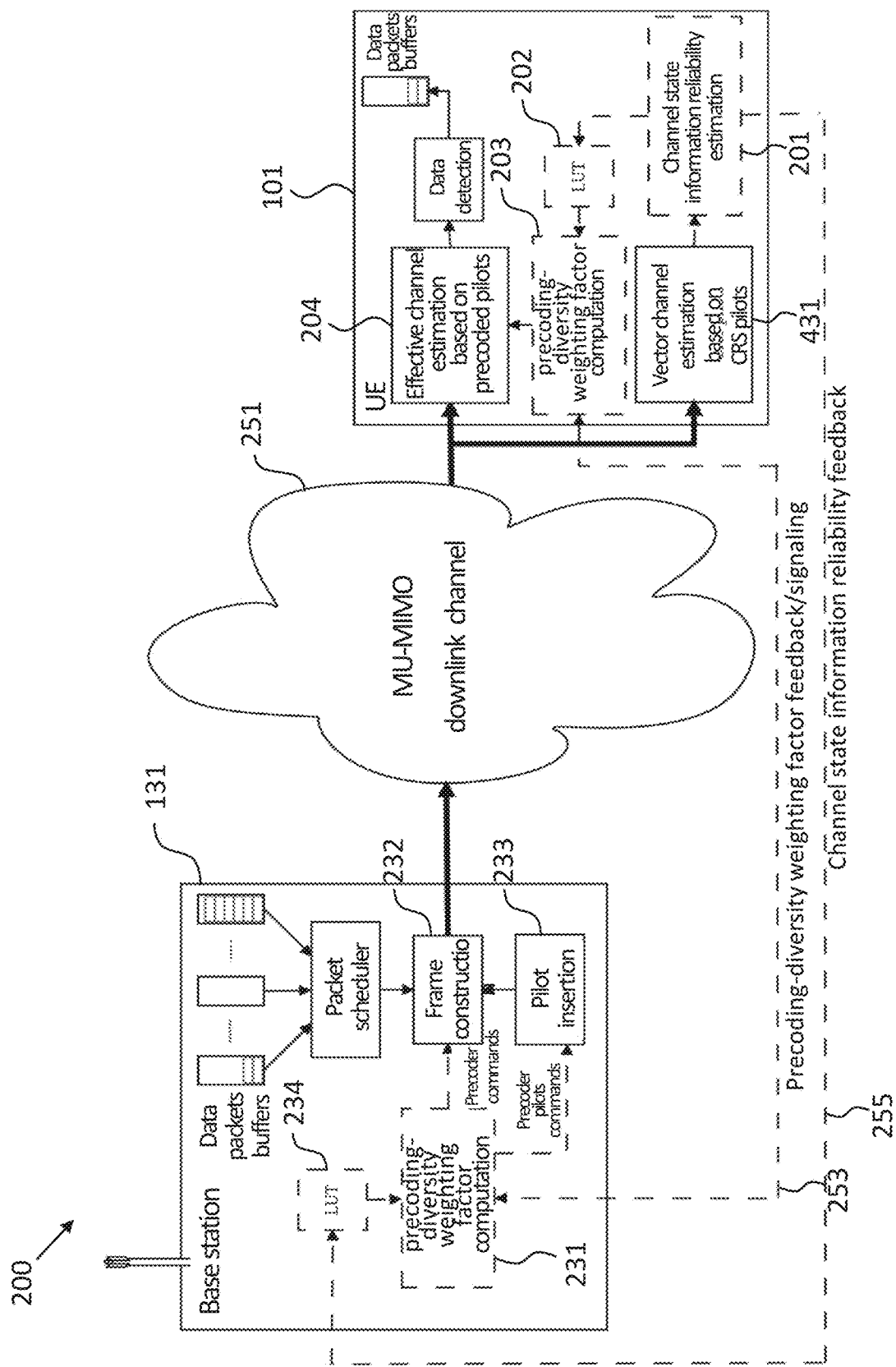
FIG. 2 shows a schematic diagram illustrating a multi-user MIMO (MU-MIMO) system which comprises a user equipment and a MIMO base station according to an embodiment.

FIG. 2 shows a schematic diagram illustrating a MU-MIMO system 200 which comprises a user equipment 101 and a base station 131 according to an embodiment, wherein the user equipment 101 and the base station 131 can communication via a MU-MIMO downlink channel 251 and the blocks drawn with dashed lines represent the new functionalities according to the embodiments of the application.

At the user equipment 101, the channel estimates obtained based on cell-specific reference signals (CRS) pilots are used by the "channel state information reliability estimation" block 201 to derive the channel state information reliability metric (denoted $\rho$ in the sequel). The output of the "channel state information reliability estimation" block 201 is used to update a look-up table (LUT) 202 whose entries comprise different values of the CSI reliability metric corresponding to different values of the CSI delay.

The updated LUT 202 can be used at the user equipment 101 to feed the "precoding-diversity weighting factor computation" block 203 in order to derive the parameter (denoted $\theta$ in the sequel) needed to determine the level of tradeoff between MIMO beamforming and MUMO diversity while transmitting from the base station 131. For instance, the highest possible value of $\theta$, i.e. $\theta=1$, (typically associated with the highest possible value of $\rho$, i.e. $\rho=1$) results in a pure MIMO beamforming transmission scheme, whereas the smallest possible value of $\theta$ i.e., $\theta=1/T$ for some integer $T \ge 2$ (typically associated with the smallest possible value of $\rho$ i.e., $\rho=0$) results in a pure MIMO diversity transmission scheme.

The determined value can be sent to the base station 131 using a "precoding-diversity weighting factor feedback" message 253. If this parameter is modified by the base station 131 before being used, then the updated value is signaled using a "precoding-diversity weighting factor signaling" message 253. In case joint effective channel estimation across resource units with different levels of beamforming-diversity tradeoffs is needed, then the values of these levels need to be communicated by the "precoding-diversity weighting factor computation" block 203 to the "effective channel estimation" block 204.

The output of the "channel state information reliability estimation" block 201 can also be fed back to the base station 131 using a "channel state information reliability feedback" message 255. This message is used at the base station 131 to update a look-up table (LUT) 234 similar in its definition to its counterpart of the user equipment 101. The output of the "precoding-diversity weighting factor computation" block 231 at the base station 131 is used to derive "precoder commands" that affect the computation of the MIMO precoders in the frame construction" block 232 and "precoded pilots commands" which affect the "pilot insertion" block 233 to make sure that the precoded pilots are precoded with the same MIMO precoders dictated by the "precoding-diversity weighting factor computation" block 231.

Figure 3:
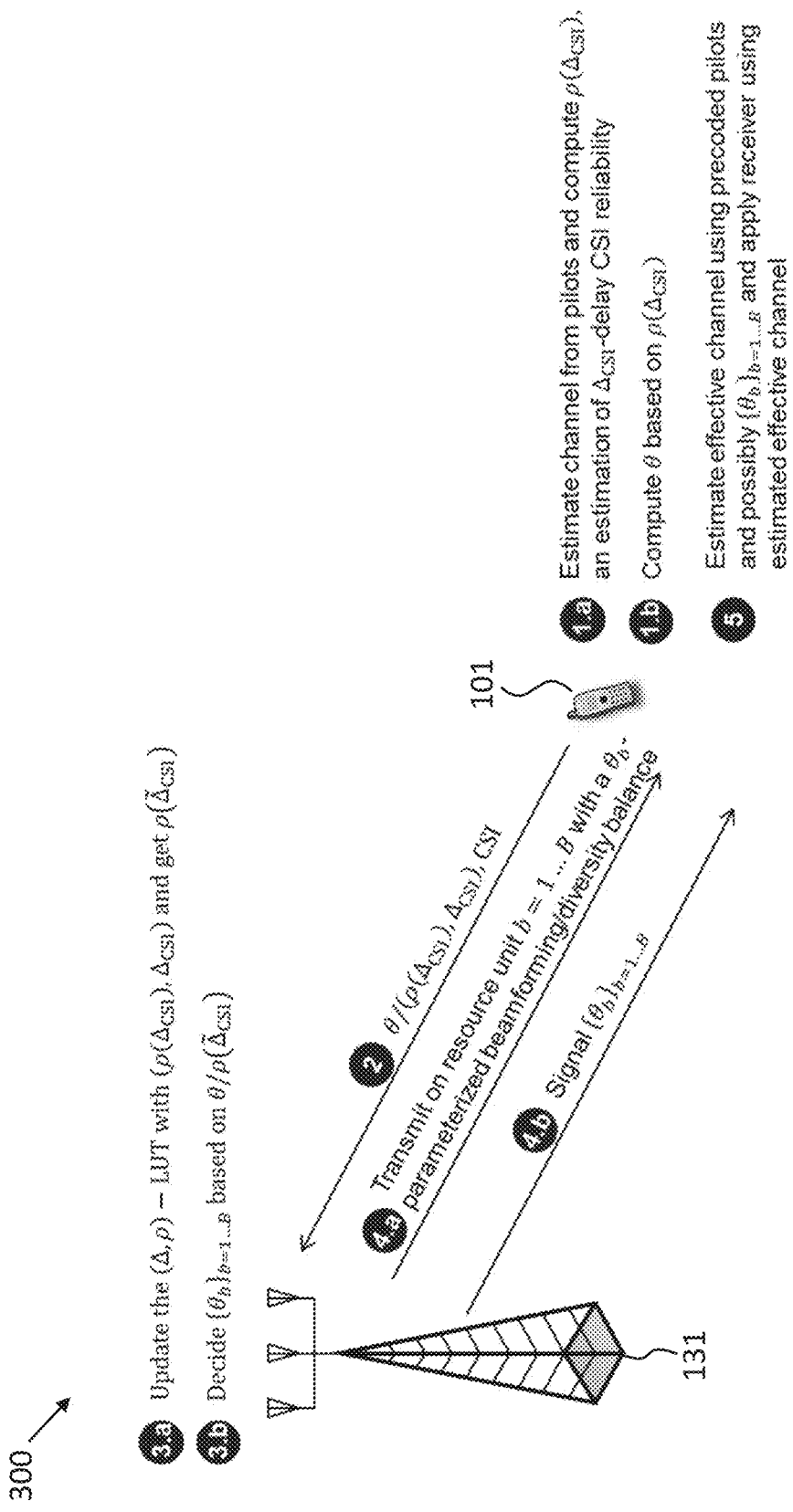
FIG. 3 shows a schematic diagram summarizing a procedure for estimating an effective channel in a communication network according to an embodiment.

FIG. 3 shows a schematic diagram summarizing a procedure 300 for estimating an effective channel in a communication network according to an embodiment, wherein the communication network comprises a user equipment 101 and a base station 131. In the following, $N_{Tx}$ and $N_{Rx}$ designate the number of antenna elements at the base station 131 and the user equipment 101 respectively and the snr value represents the received signal-to-noise ratio. The procedure 300 shown in FIG. 3 comprises the following steps:

Step 1.a: First, the user equipment (UE) 101 estimates the downlink channel from cell specific reference signals e.g., CRS to get $\hat{h}_t$, a vectorized version of the UE channel matrix or a vectorized version of a quantization of this matrix. It then computes an estimation of the correlation coefficient $\rho(\Delta_{CSI})$ between channel estimates separated in time by the value $\Delta_{CSI}$, where $\Delta_{CSI}$ is the delay between the two latest CRS receptions. One possible way of doing this is by keeping track of the $\Delta \rightarrow \rho(\Delta)$ mapping using a dynamic look-up table (LUT) (with entries initially set to zeros) and updating the $\Delta_{CSI} \rightarrow \rho(\Delta_{CSI})$ entry by applying $$\rho(\Delta_{CSI}, \text{new}) = \alpha \frac{\hat{h}_{t-\Delta_{CSI}}^H \hat{h}_t}{\|\hat{h}_{t-\Delta_{CSI}}\| \|\hat{h}_t\|} + (1-\alpha)\rho(\Delta_{CSI}, \text{old}),$$

wherein $0 \leq \alpha \leq 1$ is a predefined averaging coefficient.

Step 1.b: Secondly, if needed, the user equipment 101 applies a mapping to the estimated correlation to obtain the desired parameter $\theta$, which can take the form $\theta = f_s(\rho(\Delta_{CSI}), \text{snr}, N_{Tx}, N_{Rx})$. Subscript s stands for the index of the current cell setting scenario among a set of predefined scenarios, e.g., urban micro cell, suburban macro cell, etc. These mappings will often be LUTs stored at the user equipment 101. In case of multiple possible values of s, the particular LUT to be used can be signaled by the base station 131 using a dedicated signaling channel or it can be estimated at the user equipment 101.

Step 2: The user equipment (UE) 101 either feeds back the value of $\rho(\Delta_{CSI})$ and $\Delta_{CSI}$ or the value of $\theta$, or both of them. The user equipment (UE) 101 also feeds back the pre-coding matrix index (PMI) or quantized channel state information (CSI) values depending on the mode of operation. It is worth noting that $\theta$ does not need to be communicated as often as the other indicators, and can have its own feedback period.

Step 3.a: The base station 131 receives and processes the channel state information (CSI) accuracy feedback as follows. Upon receiving $\rho(\Delta_{CSI})$ and $\Delta_{CSI}$, the base station 131 processes this value by taking into account the actual value $\tilde{\Delta}_{CSI}$ of the CSI delay at the moment of the transmission where $\tilde{\Delta}_{CSI} = \Delta_{CSI} + t_{Tr} - t_{CSI}$ and where $t_{Tr}$ stands for the moment of transmission and $t_{CSI}$ for that of reception of the feedback from the user equipment 101.

Step 3.b: In case of feedback of $(\rho(\Delta_{CSI}), \Delta_{CSI})$ from the user equipment 101, the base station 131 uses the feedback values to update a dynamic LUT similar to its user equipment counterpart introduced in step 1.a by updating the $\Delta_{CSI} \rightarrow \rho(\Delta_{CSI})$ entry as follows:

$$\rho(\Delta_{CSI}, \text{new}) = \alpha \frac{\hat{h}_{t-\Delta_{CSI}}^H \hat{h}_t}{\|\hat{h}_{t-\Delta_{CSI}}\| \|\hat{h}_t\|} + (1-\alpha)\rho(\Delta_{CSI}, \text{old}).$$

Here, $0 \leq \alpha \leq 1$ is a predefined averaging coefficient. Next, the base station 131 gets the estimated CSI accuracy metric $\rho(\tilde{\Delta}_{CSI})$ by accessing the entry corresponding to the delay $\tilde{\Delta}_{CSI}$ from the abovementioned LUT or by using an interpolation method if this entry does not exist yet. It then applies a mapping to obtain the desired parameter $\theta$, which can take the form $\theta = f_s(\rho(\Delta_{CSI}), \text{snr}, N_{Tx}, N_{Rx})$ and which can be stored as a set of LUTs corresponding to different values of the scenario index s. As already mentioned in step 1.a. In case of explicit feedback of $\delta$ by the user equipment 101, the previous step can be skipped. Next, the base station 131 produces a set of weighting scalars $\{\theta_b\}_{b=1 \ldots B}$ and a mapping between said set of scalars and the resource units R available to the user. This plurality of weight scalars can be derived from $\theta$ by adding/subtracting to/from the reported value perturbations taken from a predefined set of values to compensate, for example, any potential imprecision produced while computing $\theta$.

Step 4.a: The base station 131 enters the transmission phase, where the base station 131 transmits available data using an adaptive balanced MIMO beamforming and diversity scheme parameterized with on the different resource units with the scalars taken from $\{\theta_b\}_{b=1 \ldots B}$. One example of such a transmission scheme is ST(F)BC precoded with a matrix whose columns: when used on resource unit $b \in \{1, \ldots, B\}$, are scaled in accordance with the weight $\theta_b$ determined as explained above.

Step 4.b: If applicable e.g., in case precoder granularity is a resource element (RE) or a resource block (RB), the base station 131 signals the weighting scalars pattern $\{\theta_b\}_{b=1 \ldots B}$ to the user equipment 101 using a dedicated downlink control message. Indeed, in such cases, these weights are needed at the user equipment to perform joint effective channel estimation across neighboring resource units.

Step 5: Upon reception of the downlink data transmission, the user equipment 101 can estimate the effective channels using precoded pilots and the signaled weight pattern if applicable and apply the appropriate MIMO receiver using the estimated effective channels.

Embodiments of the application offer in particular the following advantage: the possibility of achieving better reliability performance, e.g., lower block error rate values, compared to state-of-the-art MIMO solutions while the same cell-specific pilot overhead i.e., the same CS accuracy level is required. Indeed, tuning the balance between MIMO beamforming and MIMO diversity as enabled by the embodiments of the application thanks to the proposed CSI accuracy metric can only result, in principle, in a better reliability performances compared to existing solutions while achieving, at least, the same throughput performance.

Another advantage provided by embodiments of the application is the possibility of increasing the system throughput compared to existing solutions for MIMO transmission. Indeed, using the best balance between MIMO beamforming and MIMO diversity allows to achieve the same target reliability performance as state-of-the-art solutions while requiring a lower periodicity for transmitting cell specific pilots e.g., CSI-RS. The overhead associated with cell specific pilots is thus reduced and the effective system throughput is increased.

In summary, embodiments of the application can compute channel state information reliability metrics at the user equipment 101 (UE) and feed the obtained channel state information reliability metrics to the base station 131. The corresponding method comprises a step of estimating the correlation coefficient $\rho(\Delta)$ between different instances of the estimated channel vectors at the user equipment separated by possibly different values of CSI delays $\Delta$ by constantly updating a LUT corresponding to the $\Delta \rightarrow \rho(\Delta)$ mapping, and a step of feeding back the latest estimated correlation coefficient along with the value of the delay that was assumed while computing it.

Furthermore, embodiments of the application can process at the user equipment 101 the obtained channel state information reliability/accuracy metrics to produce, with the help of a LUT, a plurality of scalar weights to be used on a corresponding plurality of time-frequency resource units to accordingly tune an adaptive balanced MIMO beamforming and diversity transmission scheme, by using possibly instruction signaled by the base station 131 e.g., which LUT to use from a plurality of predefined LUTs. Embodiments of the application can also generate these instruction messages at the base station 131.

Furthermore, embodiments of the application can feedback the obtained scalar weights from the user equipment 101 to the base station 131 and process the feedback channel state information reliability metrics from one or several user equipments. This processing at the base station 131 translates the reported values into a plurality of scalar weights to be used on a corresponding plurality of time-frequency resource units to accordingly tune an adaptive balanced MIMO beamforming/diversity transmission scheme. Finally, the determined scalar weights can be signaled to the intended user equipment 101.

Figure 4:
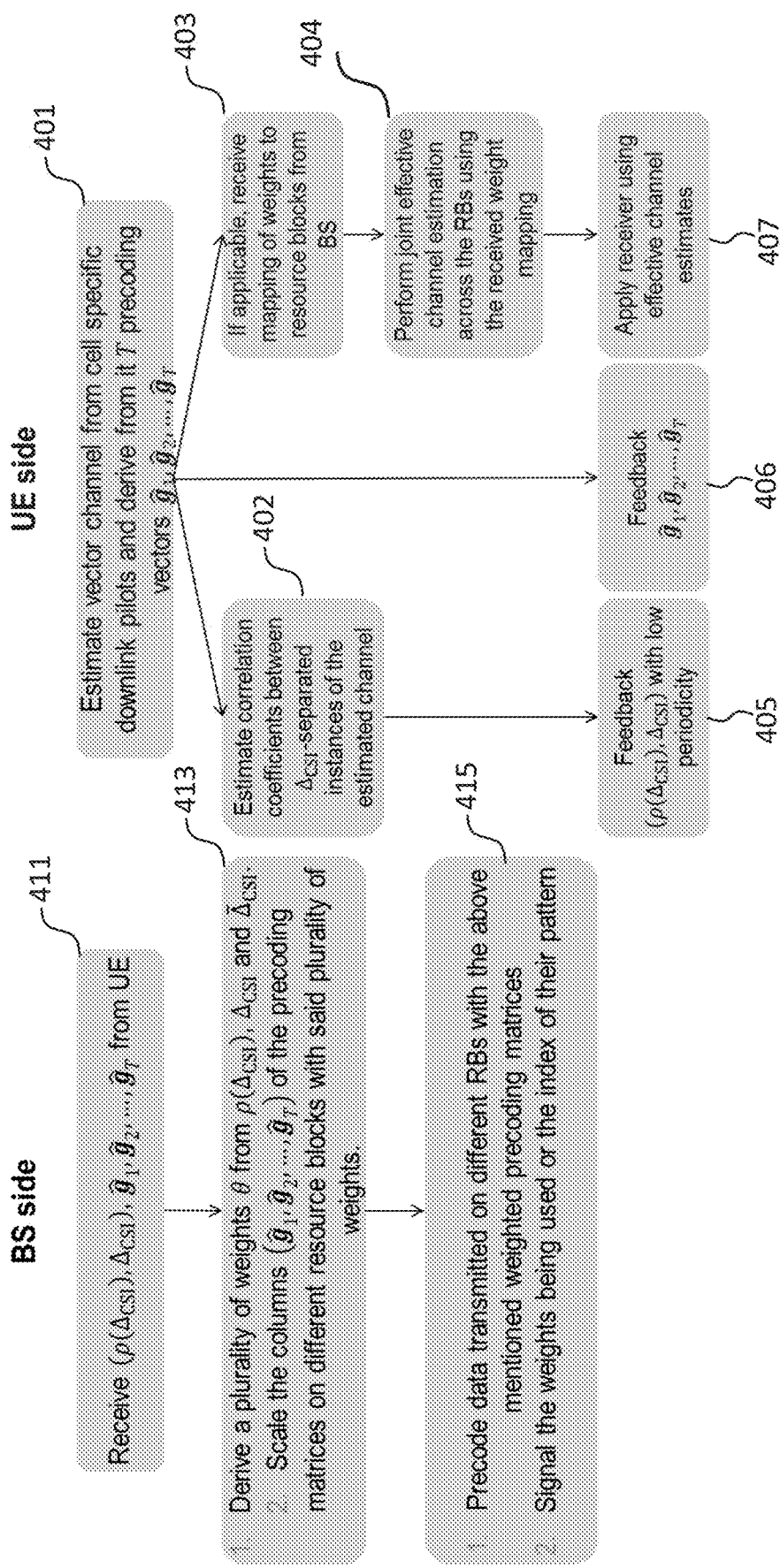
FIG. 4 shows a schematic diagram summarizing a procedure for determining an adaptive balanced scheme of MIMO beamforming and ST(F)BC diversity with explicit CSI reliability feedback according to an embodiment.

FIG. 4 shows a schematic diagram summarizing a procedure for determining an adaptive balanced scheme of MIMO beamforming and ST(F)BC diversity with explicit CSI reliability feedback according to an embodiment. The procedure shown in FIG. 4 comprises the following steps at the user equipment 101 and the base station 131 respectively:

At the user equipment 101, the user equipment 101 estimates vector channel from cell specific downlink pilot (step 401).

The user equipment 101 estimates CSI correlation coefficients between $\Delta_{CSI}$-separated instances of the estimated channel (step 402) and feeds the values to the base station 131 (step 405).

If applicable, the user equipment 101 receives mapping of weights to resource blocks from the base station 131 (step 403) and performs joint effective channel estimation across the resource blocks using the received weight mapping (step 404).

The user equipment 101 applies the appropriate MIMO receiver using the estimated effective channels (step 407).

At the base station 131, the base station 131 receives the CSI correlation coefficients from the user equipment 101 (step 411).

The base station 131 derives a plurality of weights θ and scales the columns of the precoding matrices on different resource blocks with the plurality of weights (step 413).

The base station 131 precodes data transmitted on different resource blocks with the above mentioned weighted precoding matrices and signals the weights being used or the index of their pattern (step 415).

According to this embodiment, the CSI reliability feedback along with the value of $\tilde{\Delta}_{CSI} = \Delta_{CSI} + t_{Tr} - t_{CSI}$ are used to derive a plurality of weights $$\{\theta_b\}_{b=1...B}(\frac{1}{T} \le \theta_b \le 1$$

for some integer T≥2) through the mapping $\delta = f_s(\rho(\Delta_{CSI}), \text{snr}, N_{Tx}, N_{Rx})$ to be used on B RBs as follows.

On the b-th RB, matrix $W_b(\theta_b)$ is used to precode a T×T ST(F)BC matrix $\bar{c}_b$ e.g., an Alamouti code matrix with T=2, to produce $c_b = W_b \bar{c}_b$, where $W_b(\theta_b) = \tilde{W} D(\theta_b)$, $\tilde{W} = [\hat{g}_1 \ \hat{g}_2 \ ... \ \hat{g}_T]$, $$D(\theta_b) = \text{diag}\left(\sqrt{\theta_b}, \sqrt{\frac{1-\theta_b}{T-1}}, ..., \sqrt{\frac{1-\theta_b}{T-1}}\right).$$

Here, $\hat{g}_1$ is the precoder vector dictated by the latest (delayed) CSI feedback and $\hat{g}_2, ..., \hat{g}_T$ are T−1 precoding vectors that are orthogonal to $\hat{g}_1$. Note that the power allocation to the different precoding vectors i.e., the scaling of vectors $\bar{g}_1$ on the one hand and $\bar{g}_2, ..., \hat{g}_T$ on the other, is dictated by the value of $\theta_b$, which, in turn, is dictated by the CSI reliability feedback. Consider for example the mapping $$\theta = f_s(\rho(\tilde{\Delta}_{CSI}), \text{snr}, N_{Tx}, N_{Rx}) = 1 - \frac{T-1}{\mu(\rho(\tilde{\Delta}_{CSI}), \text{snr}, N_{Tx}, N_{Rx})} + \frac{T-1}{\alpha \text{snr}}$$

$$\begin{cases} \mu(\rho(\tilde{\Delta}_{CSI}), \text{snr}, N_{Tx}, N_{Rx}) = \frac{\text{snr}\left(\alpha(T+\alpha\eta)(2M-1) + |\rho|^2 N_{Tx} N_{Rx} + \sqrt{\frac{2\alpha(T+\alpha \text{snr})(2T-1)|\rho|^2 N_{Tx} N_{Rx} + }{|\rho|^4 (N_{Tx} N_{Rx})^2 + \alpha^2 (T+\alpha \text{snr})^2}}\right)}{4(T+\alpha \text{snr})^2} \\ \text{and} \\ \alpha = 1 - |\rho(\tilde{\Delta}_{CSI})|^2 \end{cases}$$

If the feedback reliability value is high (corresponding to a CSI feedback that is relatively accurate), the above-mentioned mapping will typically produce values of $\theta_b$ that are close to one i.e., most of the transmit power goes to the precoder vector $\hat{g}_1$ corresponding to the (relatively accurate) CSI feedback. However, if the CSI reliability value is low (corresponding to a CSI feedback that is relatively outdated), the mapping will typically produce values of $\theta_b$ that are close to $$\frac{1}{T}$$

i.e., the transmit power is equally divided among the T precoder vectors as there is no preferred one among them due to the low reliability of the CSI feedback.

Figure 5:
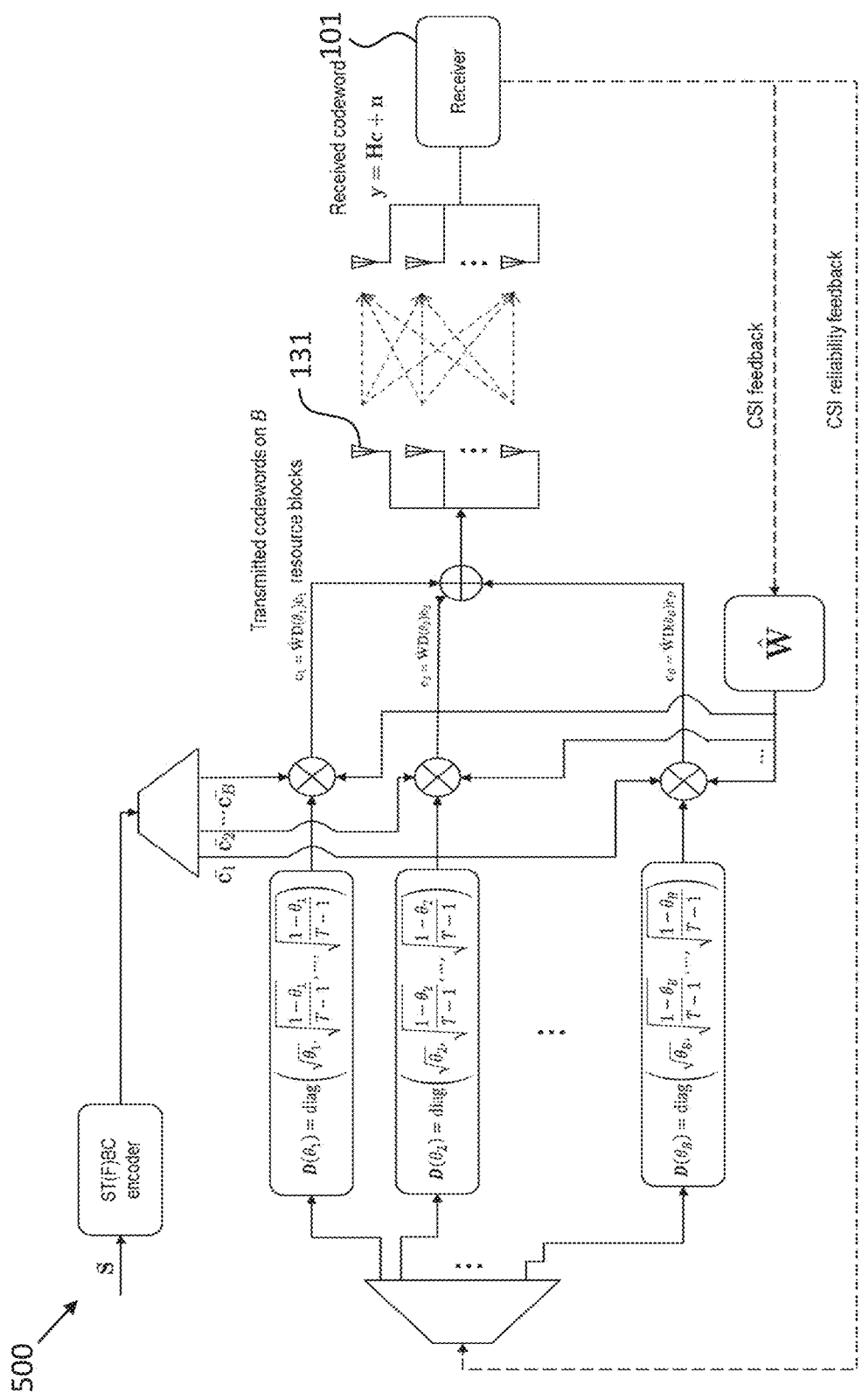
FIG. 5 shows a schematic diagram illustrating an embodiment of a communication system comprising a transmitter and a receiver for the pre-coded data transmission.

FIG. 5 shows a schematic diagram illustrating an embodiment of a communication system 500 comprising a transmitter such as a base station 131 and a receiver such as a user equipment 101 for the pre-coded data transmission, assuming a transmission taking place on B RBs using beamforming and ST(F)BC with precoding-diversity weighting factors $\{\theta_1, \theta_2, \ldots, \theta_B\}$ that have been determined as explained above in FIG. 4.

Figure 6:
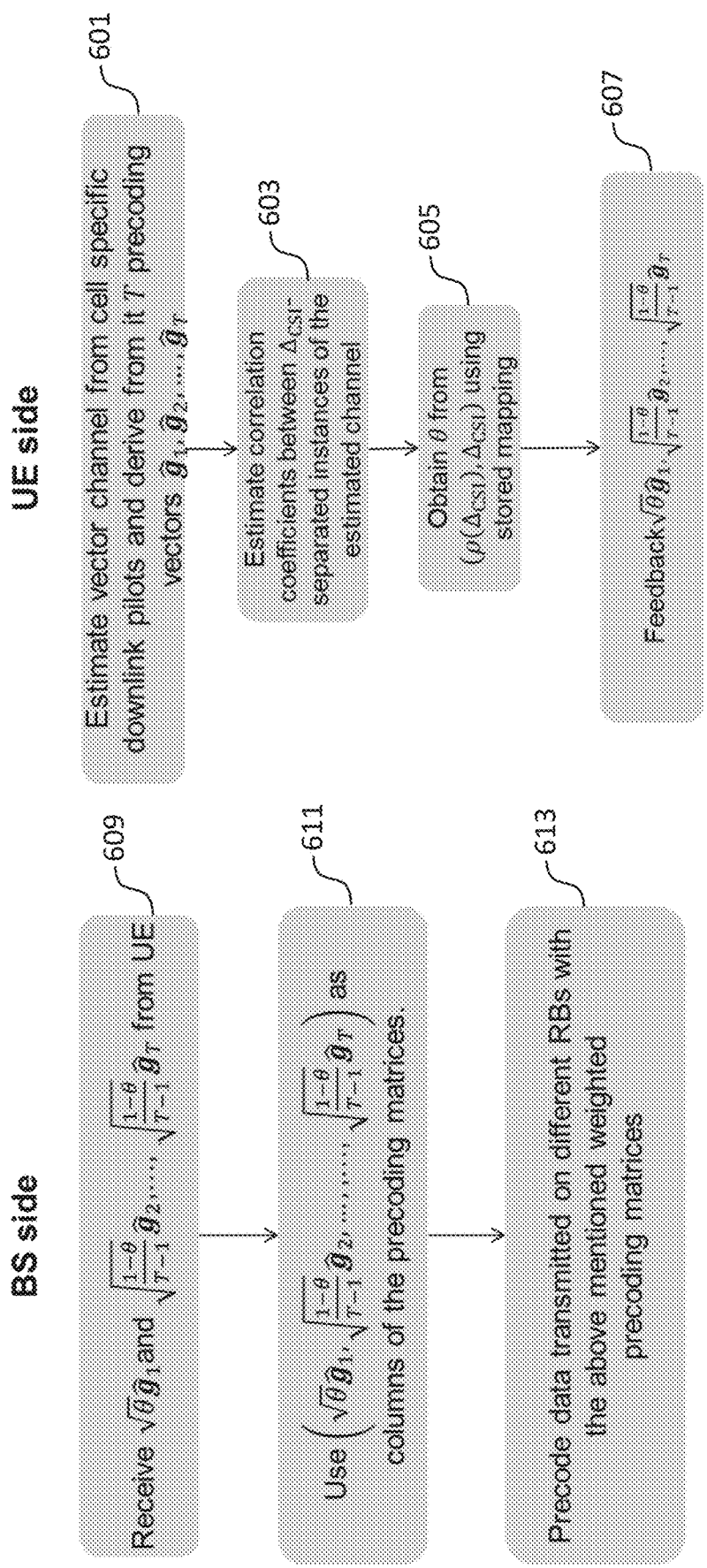
FIG. 6 shows a schematic diagram summarizing a procedure for an adaptive balanced scheme of MIMO beamforming and ST(F)BC diversity with implicit CSI reliability feedback according to an embodiment.

FIG. 6 shows a schematic diagram summarizing a procedure for an adaptive balanced scheme of MIMO beamforming and ST(F)BC diversity with implicit CSI reliability feedback according to an embodiment. The procedure shown in FIG. 6 comprises the following steps at the user equipment 101 and the base station 131 respectively.

At the user equipment 101, the user equipment 101 estimates vector downlink channel from cell specific reference signals (step 601).

The user equipment 101 estimates correlation coefficients between $\Delta_{CSI}$-separated instances of the estimated channel (step 603)

The user equipment 101 obtains the θ parameter by applying a mapping to the estimated correlation coefficients (step 605).

The θ parameter is used at the user equipment 101 to scale the columns of the precoding matrix that is fed back to the base station 131 after quantizing it using some predefined codebook (step 607).

At the base station 131, the base station 131 receives the precoding matrix sent from the user equipment 101 (step 609) and uses it as columns of the precoding matrices (step 611).

The base station 131 then pre-codes data transmitted on different resource blocks with the weighted precoding matrices (step 613).

This embodiment resembles the previous one except that the θparameter $$(\frac{1}{T} \le \theta \le 1$$

for some integer T≥2) computed at the user equipment 101 is not explicitly fed back using a dedicated feedback channel. Instead, this parameter is used at the user equipment 101 to scale the columns of the precoding matrix that will be fed back to the base station 131 (after quantizing it using some predefined codebook) and which will be used at the base station 131 to pre-code the ST(F)BC codewords before their transmission. This pre-coded data transmission can be performed by the communication network as in FIG. 5.

Figure 7:
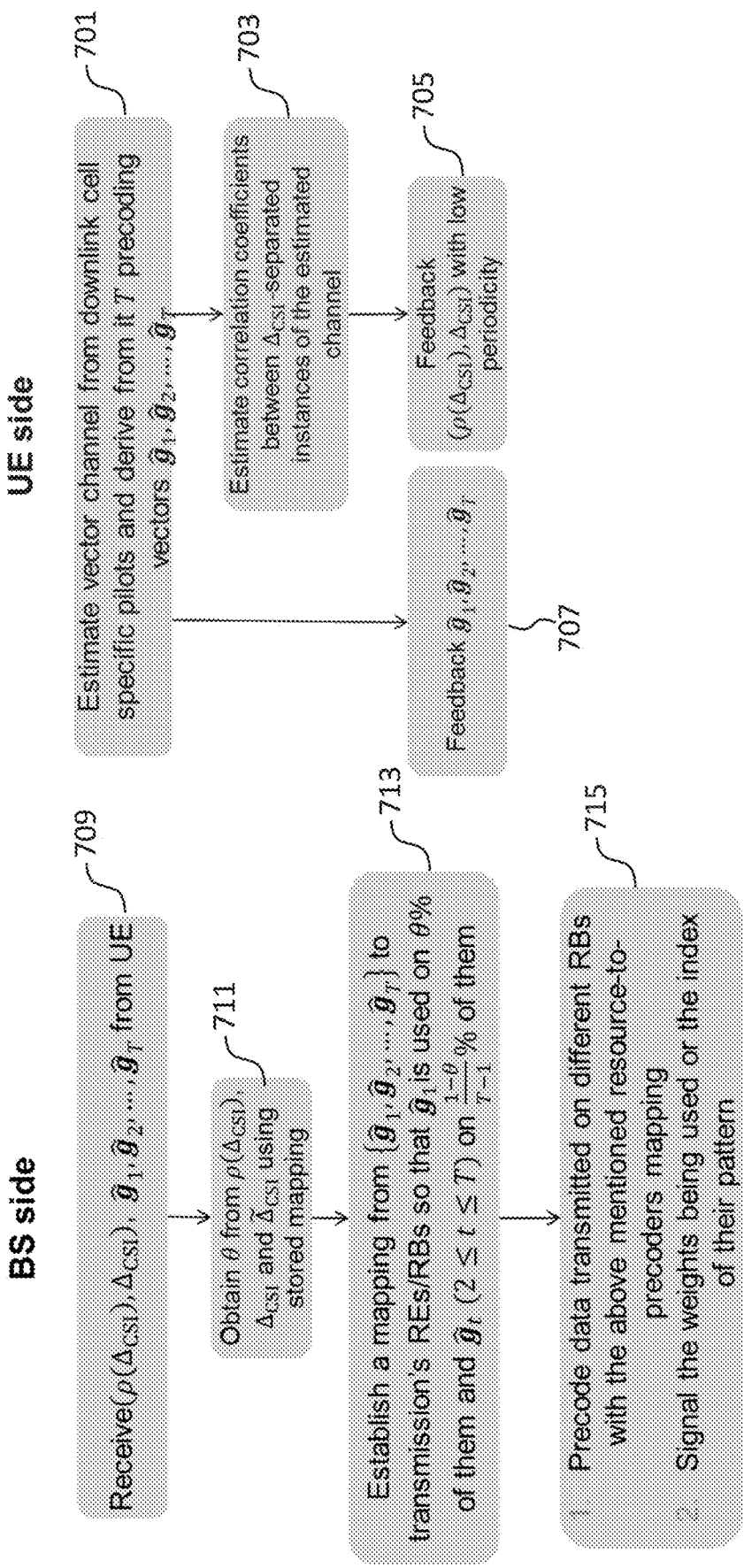
FIG. 7 shows a schematic diagram summarizing a procedure for determining an adaptive balanced scheme of MIMO beamforming and precoder cycling diversity with explicit CSI reliability feedback according to an embodiment.

FIG. 7 shows a schematic diagram summarizing a procedure for determining an adaptive balanced scheme of MIMO beamforming and precoder cycling diversity with explicit CSI reliability feedback according to an embodiment. The procedure shown in FIG. 7 comprises the following steps at the user equipment 101 and the base station 131 respectively:

At the user equipment 101, the user equipment 101 estimates downlink channel from cell specific pilots (step 701).

The user equipment 101 estimates correlation coefficients between $\Delta_{CSI}$-separated instances of the estimated channel (step 703) and feeds the values to the base station 131 (step 705).

The user equipment 101 can also feed the precoder vector $\hat{g}_1$ and possibly other precoding vectors that are orthogonal to $\hat{g}1$ (step 707).

At the base station 131, the base station receives estimated correlation coefficients and precoder vectors from the user equipment 101 (step 709).

The base station obtains the θ parameter from $(\Delta_{CSI})$, $\Delta_{CSI}$ and $\Delta_{CSI}$ using stored mapping. (step 711).

The base station 131 establishes a mapping from $\{\hat{g}_1, \hat{g}_2, \ldots, \hat{g}_T\}$ to transmission resource elements or resource blocks so that $\hat{g}_1$ is used on θ% of them and $$\hat{g}_t (2 \le t \le T) \text{ on } \frac{(1-\theta)}{T-1}\%$$

of them (step 713).

The base station 131 then pre-codes data transmitted on different resource blocks with the above resource-to-precoder mapping and signals the weights being used or the index of their pattern (step 715).

In this embodiment, a percentage equal to $$\theta(\frac{1}{T} \le \theta \le 1$$

for some integer T≥2) of the resource elements (REs), resource blocks (RBs) or resource block groups (RBGs) out of the total time-frequency resources available for the MIMO transmission is done using a beam/precoder based on the reported (delayed) CSI and a percentage equal to 1−θ of these resources is done using beams/precoders belonging to a subset of cardinality T−1 selected from a predefined MIMO transmission codebook and which are orthogonal/quasi-orthogonal to the beam/precoder based on the reported CSI. As in the two above-mentioned embodiments, parameter θ is computed (see FIG. 7) as a function of $\rho(\tilde{\Delta}_{CSI})$ which is itself a function of the actual CSI delay $\tilde{\Delta}_{CSI}$ at the moment of transmission and of the CSI reliability metric $\rho(\Delta_{CSI})$ measured assuming a CSI delay value $\Delta_{CSI}$ that could be different from $\tilde{\Delta}_{CSI}$. An example of such a function is $\theta=(1-1/T)\rho(\tilde{\Delta}_{CSI})+1/T$.

It is worth noting that this mapping results in θ=1/T, i.e., full randomization and maximum diversity, when the reliability metric is the smallest i.e., $\rho(\tilde{\Delta}_{CSI})=0$. However, when the reliability metric is at its highest possible value i.e., $\rho(\tilde{\Delta}_{CSI})=1$, then the mapping results in θ=1 i.e., no randomization as only the beam/precoder based on the reported CSI is used for MIMO transmission on the considered time-frequency resources.

Figure 8:
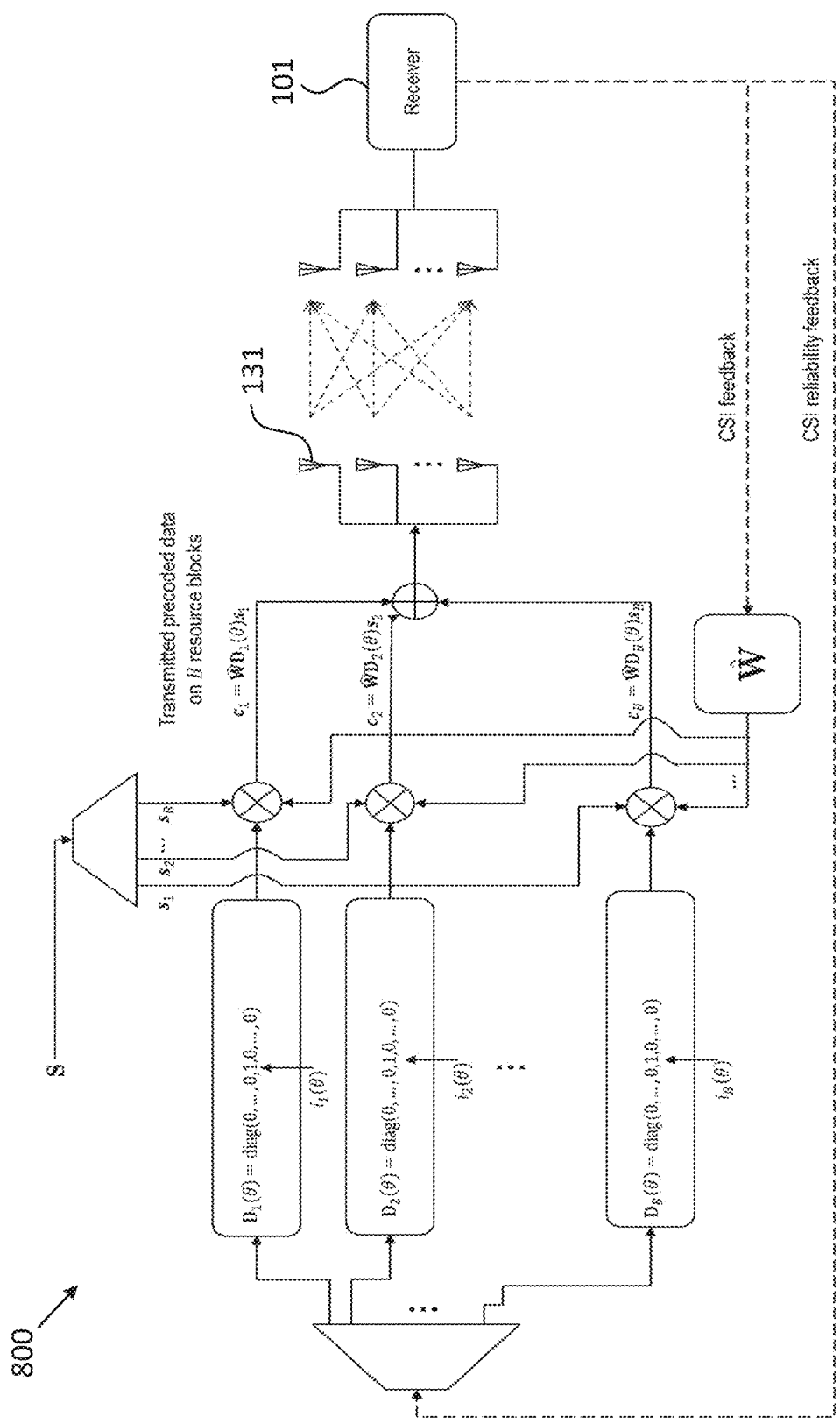
FIG. 8 shows a schematic diagram illustrating an embodiment of a communication system comprising a transmitter and a receiver for the pre-coded data transmission.

FIG. 8 shows a schematic diagram illustrating an embodiment of a communication system 800 comprising a transmitter such as a base station 131 and a receiver such as a user equipment 101 for the pre-coded data transmission, assuming a transmission taking place on B RBs using beamforming/precoder cycling with precoding-diversity weighting factor θ that has been determined as in FIG. 7. The indexes shown in FIG. 8 are selected such that $|\{b \in \{1, \ldots, B\}| i_b(\theta)=1\}| \approx \theta$, where notation |ε| stands for the cardinality of the set ε.

Figure 9:
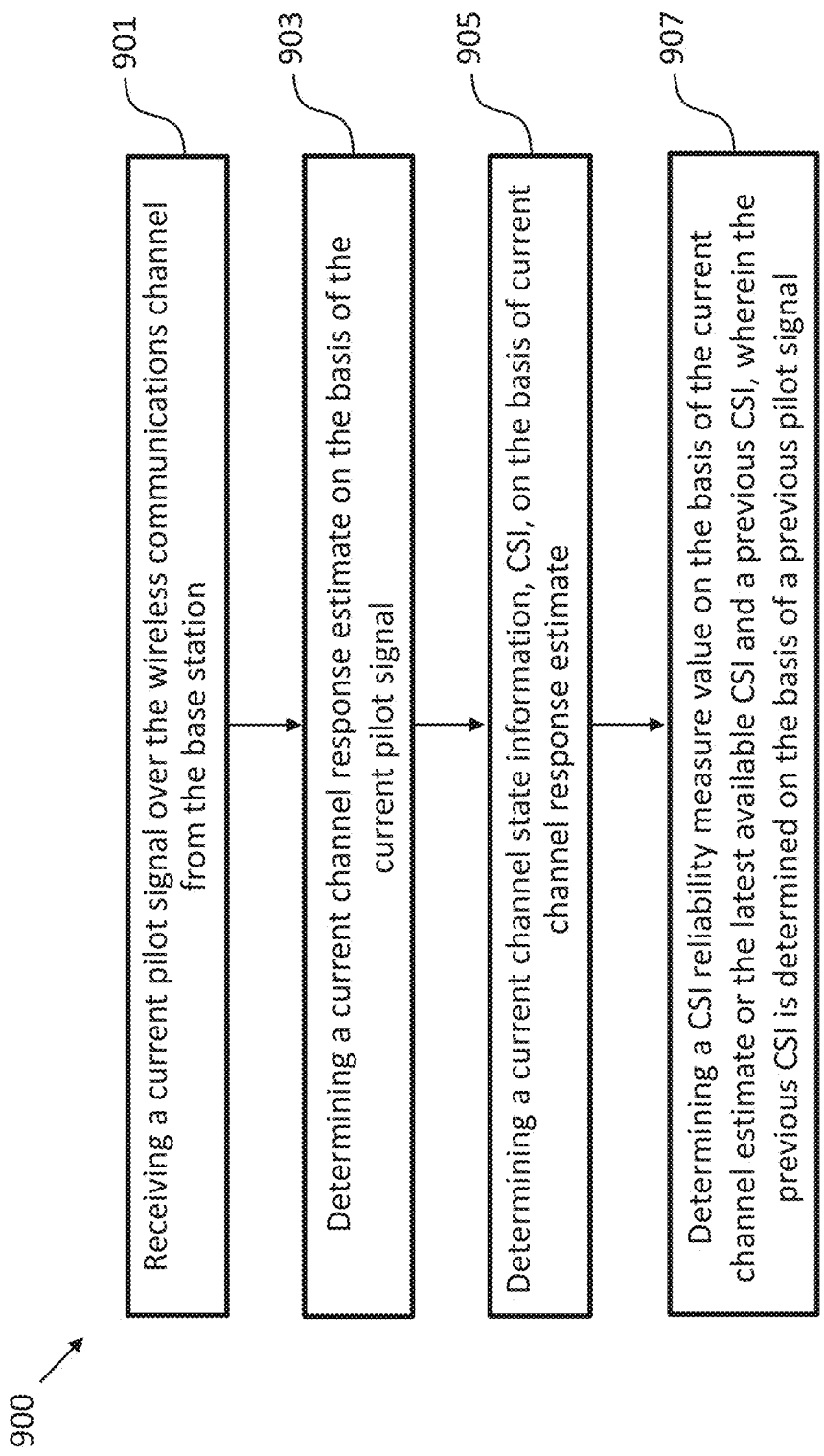
FIG. 9 shows a schematic diagram illustrating a method of operating a user equipment according to an embodiment.

FIG. 9 shows a schematic diagram illustrating a method 900 of operating a user equipment 101 for wireless communications with a base station 131 over a wireless communications channel.

The method 900 comprises the following steps performed by the user equipment 101: receiving 901 a current pilot signal over the wireless communications channel from the base station 131; determining 903 a current channel response estimate on the basis of the current pilot signal; determining 905 a current channel state information, CSI, on the basis of current channel response estimate: and determining 907 a CSI reliability measure value on the basis of the current channel estimate or the latest available CSI and a previous CSI, wherein the previous CSI is determined on the basis of a previous pilot signal, i.e. previously received pilot signal.

Figure 10:
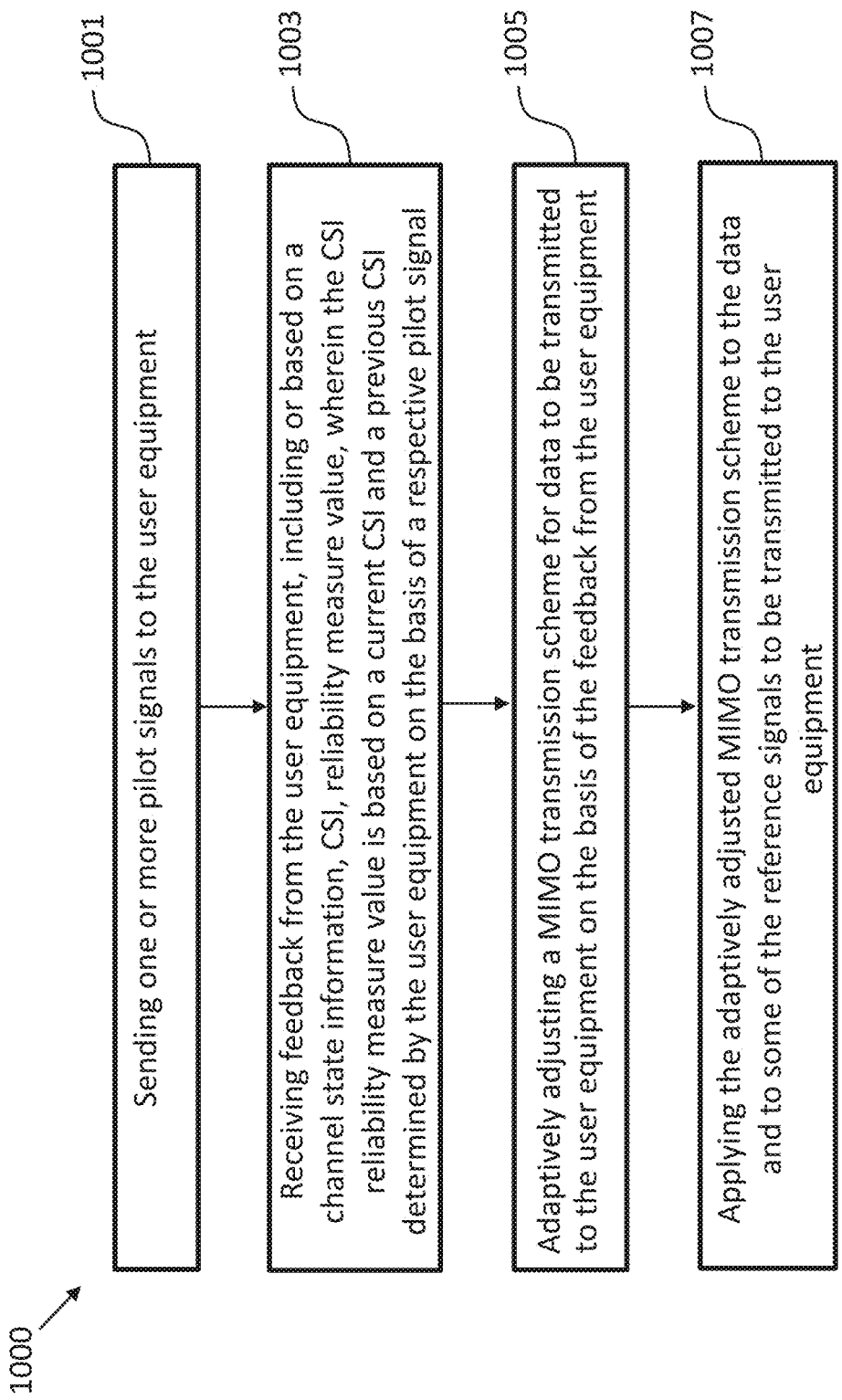
FIG. 10 shows a schematic diagram illustrating a method of operating a MIMO base station according to an embodiment.

FIG. 10 shows a schematic diagram illustrating a method 1000 of operating a MIMO base station 131 for wireless communications with a user equipment 101 over a wireless communications channel.

The method 1000 comprises the following steps performed by the MIMO base station 131: sending 1001 one or more pilot signals to the user equipment 101; receiving 1003 feedback from the user equipment 101, including or based on a channel state information, CSI, reliability measure value, wherein the CSI reliability measure value is based on a current CSI and a previous CSI determined by the user equipment on the basis of a respective pilot signal; adaptively adjusting 1005 a MIMO transmission scheme for data to be transmitted to the user equipment 101 on the basis of the feedback from the user equipment 101; and applying 1007 the adaptively adjusted MIMO transmission scheme to the data and to some of the reference signals to be transmitted to the user equipment 101.

While a particular feature or aspect of the disclosure may have been disclosed with respect to only one of several implementations or embodiments, such feature or aspect may be combined with one or more other features or aspects of the other implementations or embodiments as may be desired and advantageous for any given or particular application. Furthermore, to the extent that the terms "include", "have", "with", or other variants thereof are used in either the detailed description or the claims, such terms are intended to be inclusive in a manner similar to the term "comprise". Also, the terms "exemplary", "for example" and "e.g." are merely meant as an example, rather than the best or optimal. The terms "coupled" and "connected", along with derivatives may have been used. It should be understood that these terms may have been used to indicate that two elements cooperate or interact with each other regardless whether they are in direct physical or electrical contact, or they are not in direct contact with each other.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

Many alternatives, modifications, and variations will be apparent to those skilled in the art in light of the above teachings. Of course, those skilled in the art readily recognize that there are numerous applications of the application beyond those described herein. While the present application has been described with reference to one or more particular embodiments, those skilled in the art recognize that many changes may be made thereto without departing from the scope of the present application. It is therefore to be understood that within the scope of the appended claims and their equivalents, the application may be practiced otherwise than as specifically described herein.

The invention claimed is:

1. A user equipment for wireless communications with a multiple-input multiple-output (MIMO) base station over a wireless communications channel, wherein the user equipment comprises:
   a communications interface configured to receive a current pilot signal over the wireless communications channel from the base station;
   at least one processor; and
   at least one memory coupled to the at least one processor and storing programming instructions for execution by the at least one processor to:
      determine a current channel state information (CSI) based on the current pilot signal; and
      in response to determining the current CSI, determine a CSI reliability measure value based on the determined current CSI and one or more stored previous CSI, wherein the CSI reliability measure value indicates how accurate the current CSI is, and wherein the previous CSI is determined based on previous pilot signals; and
   wherein the communications interface is further configured to transmit the CSI reliability measure value to the base station for allowing the base station to determine a precoding-diversity weighting factor based on the CSI reliability measure value, and wherein the precoding-diversity weighting factor allows the base station to adaptively adjust a MIMO transmission scheme for data to be transmitted to the user equipment by weighting a beamforming precoding component and a diversity precoding component of the MIMO transmission scheme.

2. The user equipment of claim 1, wherein the programming instructions are for execution by the at least one processor to determine the precoding-diversity weighting factor based on CSI reliability measure value, and wherein the communications interface is configured to transmit the precoding-diversity weighting factor to the base station.

3. The user equipment of claim 2, wherein the programming instructions are for execution by the at least one processor to determine the precoding-diversity weighting factor based on the CSI reliability measure value by using a mapping between the CSI reliability measure value and the precoding-diversity weighting factor.

4. The user equipment of claim 3, wherein the programming instructions are for execution by the at least one processor to determine the precoding-diversity weighting factor, $\theta$, based on the CSI reliability measure value, $\rho$, by using the mapping between the CSI reliability measure value and the precoding-diversity weighting factor defined by a following equation:

$$\theta = (1-1/T)\rho + 1/T,$$

wherein T denotes a system parameter integer value $\geq 2$.

5. The user equipment of claim 1, wherein the programming instructions are for execution by the at least one processor to determine CSI reliability measure values corresponding to different CSI delay values $\Delta_{CSI}$ as a correlation coefficient between a current channel response estimate or the current CSI and a previous CSI separated by an amount of time equal to $\Delta_{CSI}$ from the current channel response estimate or the current CSI.

6. The user equipment of claim 5, wherein the programming instructions are for execution by the at least one processor to determine the CSI reliability measure value $\rho(\Delta_{CSI}, \text{new})$ corresponding to the CSI delay $\Delta_{CSI}$ based on the following equation:

$$\rho(\Delta_{CSI}, \text{new}) = \alpha \frac{\hat{h}_{t-\Delta_{CSI}}^{H} h_t}{\|\hat{h}_{t-\Delta_{CSI}}\| \|h_t\|} + (1-\alpha)\rho(\Delta_{CSI}, \text{old}),$$

wherein $\|X\|$ for some vector of matrix X stands for the value of a norm of X, $\Delta_{CSI}$ denotes the time delay between the reception of the previous pilot signal and the current pilot signal by the communications interface, a denotes an averaging coefficient in the range from 0 to 1, $h_t$ denotes the vectorized form of the current channel response estimate, $\hat{h}_{t-\Delta_{CSI}}^{H}$ denotes the conjugate transpose of the vectorized form of a quantized previous channel response estimate and $\rho(\Delta_{CSI}, \text{old})$ denotes a previous CSI reliability measure value corresponding to CSI delay $\Delta$CSI.

7. The user equipment of claim 5, wherein the programming instructions are for execution by the at least one processor to determine the CSI reliability measure value $\rho(\Delta_{CSI}, \text{new})$ corresponding to the CSI delay $\Delta_{CSI}$ based on the following equation:

$$\rho(\Delta_{CSI}, \text{new}) = \alpha \frac{\hat{h}_{t-\Delta_{CSI}}^{H} \hat{h}_t}{\|\hat{h}_{t-\Delta_{CSI}}\| \|\hat{h}_t\|} + (1-\alpha)\rho(\Delta_{CSI}, \text{old}),$$

wherein $\Delta_{CSI}$ denotes the time delay between the reception of the previous pilot signal and the current pilot signal by the communications interface, a denotes an averaging coefficient in the range from 0 to 1, $\hat{h}_t$ denotes the vectorized form of a quantized current channel response estimate, $\hat{h}_{t-\Delta_{CSI}}^{H}$ denotes the conjugate transpose of the vectorized form of a quantized previous channel response estimate and $\rho(\Delta_{CSI}, \text{old})$ denotes a previous CSI reliability measure value corresponding to CSI delay $\Delta$CSI.

8. The user equipment of claim 6, wherein the programming instructions are for execution by the at least one processor to store the value o $\rho(\Delta_{CSI}, \text{new})$ in an initially empty look up table whose first column is composed of the CSI delay values $\Delta_{CSI}$ that have been treated so far by the user equipment and whose second column is composed of the CSI reliability measure values corresponding to the CSI delay values of the first column.

9. The user equipment of claim 8, wherein the programming instructions are for execution by the at least one processor to read the value of $\rho(\Delta_{CSI}, \text{old})$ from the look up table comprising:
reading the value of $\rho(\Delta_{CSI}, \text{old})$, in response to determining that an entry $(\Delta_{CSI}, \rho(\Delta_{CSI}))$ already exists in the look up table;
assigning a default value for $\rho(\Delta_{CSI}, \text{old})$; or
obtaining an interpolated value based on existing entries from the look up table, wherein $$\rho(\Delta_{CSI}, \text{old}) = \frac{\Delta_{CSI} - \Delta_{CSI,1}}{\Delta_{CSI,2} - \Delta_{CSI,1}} \rho(\Delta_{CSI,1}) + \frac{\Delta_{CSI,2} - \Delta_{CSI}}{\Delta_{CSI,2} - \Delta_{CSI,1}} \rho(\Delta_{CSI,2}),$$

and wherein $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \Delta_{CSI} \leq \Delta_{CSI,2}$.

10. A method of operating a user equipment for wireless communications with a base station over a wireless communications channel, wherein the method comprises:
receiving a current pilot signal over the wireless communications channel from the base station;
determining a current channel response estimate based on the current pilot signal;
determining a current channel state information (CSI) based on the current channel response estimate;
in response to determining the current CSI, determining a CSI reliability measure value based on the current channel response estimate or a latest available CSI and a stored previous CSI, wherein the CSI reliability measure value indicates how accurate the current channel response estimate or the latest available CSI is, and wherein the stored previous CSI is determined based on a previous pilot signal; and
transmitting the CSI reliability measure value to the base station for allowing the base station to determine a precoding-diversity weighting factor based on the CSI reliability measure value, wherein the precoding-diversity weighting factor allows the base station to adaptively adjust a multiple-input multiple-output (MIMO) transmission scheme for data to be transmitted to the user equipment by weighting a beamforming precoding component and a diversity precoding component of the MIMO transmission scheme.

11. A multiple-input multiple-output (MIMO) base station for wireless communications with a user equipment over a wireless communications channel, wherein the MIMO base station comprises:
at least one processor;
at least one memory coupled to the at least one processor and storing programming instructions for execution by the at least one processor to apply an adaptively adjustable MIMO transmission scheme to data to be transmitted to the user equipment; and
a communications interface including a plurality of antennas, wherein the communications interface is configured to:
send one or more pilot signals to the user equipment; and
in response to sending the one or more pilot signals, receive feedback from the user equipment, wherein the feedback includes a channel state information (CSI) reliability measure value and a CSI delay $\Delta_{CSI}$ to which the reliability measure corresponds, wherein the CSI reliability measure value is based on a current channel estimate or latest CSI and a stored previous CSI determined by the user equipment based on a respective pilot signal, and wherein the CSI reliability measure value indicates how accurate the current channel estimate or the latest CSI is; and
wherein the programming instructions are for execution by the at least one processor to:
determine a precoding-diversity weighting factor based on the CSI reliability measure value; and
adaptively adjust the MIMO transmission scheme by weighting a beamforming precoding component and a diversity precoding component of the MIMO transmission scheme based on the precoding-diversity weighting factor.

12. The MIMO base station of claim 11, wherein the programming instructions are for execution by the at least one processor to determine the precoding-diversity weighting factor based on the CSI reliability measure value by using a mapping between the CSI reliability measure value and the precoding-diversity weighting factor.

13. The MIMO base station of claim 12, wherein the programming instructions are for execution by the at least one processor to determine the precoding-diversity weighting factor $\theta$ based on the CSI delay value $\tilde{\Delta}_{CSI}$ and an initially empty look up table, whose first column is composed of the CSI delay values $\Delta_{CSI}$ that have been treated by the user equipment and whose second column is composed of the CSI reliability measure values corresponding to the CSI delay values of the first column, by using the mapping between the CSI reliability measure value and the precoding-diversity weighting factor defined by the following equations:

$$\theta = (1-1/T)\rho(\tilde{\Delta}_{CSI}) + 1/T,$$

$$\tilde{\Delta}_{CSI} = \Delta_{CSI} + t_{Tr} - t_{CSI},$$

wherein T denotes a system parameter integer value $\geq 2$, $\Delta_{CSI}$ denotes the time delay between the reception of the previous pilot signal and the current pilot signal by the user equipment (101), $t_{Tr}$ denotes the moment of transmission and $t_{CSI}$ denotes the moment of reception of the feedback from the user equipment and $\rho(\tilde{\Delta}_{CSI})$ is obtained from the look up table comprising:
obtaining the $\rho(\tilde{\Delta}_{CSI})$ by reading an entry $(\Delta_{CSI}, \rho(\tilde{\Delta}_{CSI}))$, in response to determining that the entry $(\tilde{\Delta}_{CSI}, \rho(\tilde{\Delta}_{CSI}))$ already exists in the look up table;
assigning a default value for $\rho(\tilde{\Delta}_{CSI})$; or
obtaining an interpolated value based on existing entries from the look up table, wherein the $$\rho(\tilde{\Delta}_{CSI}) = \frac{\tilde{\Delta}_{CSI} - \Delta_{CSI,1}}{\Delta_{CSI,2} - \Delta_{CSI,1}} \rho(\Delta_{CSI,1}) + \frac{\Delta_{CSI,2} - \tilde{\Delta}_{CSI}}{\Delta_{CSI,2} - \Delta_{CSI,1}} \rho(\Delta_{CSI,2}),$$

and wherein $(\Delta_{CSI,1}, \rho(\Delta_{CSI,1}))$ and $(\Delta_{CSI,2}, \rho(\Delta_{CSI,2}))$ are two non-empty entries from the table such that $\Delta_{CSI,1} \leq \tilde{\Delta}_{CSI} \leq \Delta_{CSI,2}$.

14. The MIMO base station of claim 11, wherein the communications interface is configured to transmit a precoding-diversity weighting factor determined by the at least one processor to the user equipment.

15. The MIMO base station of claim 11, wherein the feedback from the user equipment comprises the precoding-diversity weighting factor based on the CSI reliability measure value.

16. The MIMO base station of claim 11, wherein the feedback from the user equipment comprises precoding information derived from the precoding-diversity weighting factor based on the CSI reliability measure value and wherein the programming instructions are for execution by the at least one processor to adaptively adjust the MIMO transmission scheme by weighting the beamforming precoding component and the diversity precoding component of the MIMO transmission scheme based on the precoding information reported in the user equipment feedback.

17. The MIMO base station of claim 12, wherein the adaptively adjustable MIMO transmission scheme is a precoded space time coding scheme or a precoded space frequency block coding scheme associated with a space time block coding matrix or a space frequency block coding matrix, and wherein the programming instructions are for execution by the at least one processor to adaptively adjust the MIMO transmission scheme by weighting the columns or rows of the space time block coding matrix or the space frequency block coding matrix based on the precoding-diversity weighting factor.

18. The MIMO base station of claim 17, wherein the communications interface is configured to transmit the data to the user equipment using a plurality of resource elements or a plurality of resource blocks $\{1, \ldots, B\}$ and wherein the programming instructions are for execution by the at least one processor to derive a plurality of weights $\{\theta_b\}_{b=1 \ldots B}$ based on the precoding-diversity weighting factor $\theta$ to adaptively adjust the MIMO transmission scheme by weighting the columns or rows of the space time block coding matrix or the space frequency block coding matrix used for data transmission on the plurality of resource elements or the plurality of resource blocks.

* * * * *

UNITED STATES PATENT AND TRADEMARK OFFICE
CERTIFICATE OF CORRECTION

PATENT NO. : 12,218,725 B2
APPLICATION NO. : 17/138305
DATED : February 4, 2025
INVENTOR(S) : Nassar Ksairi, Marios Kountouris and Jesus Arnau Yanez It is certified that error appears in the above-identified patent and that said Letters Patent is hereby corrected as shown below:

In the Claims

In Column 23, In Line 14 (Approx.), In Claim 6, delete "a" and insert -- $\alpha$ --.

In Column 23, In Line 20 (Approx.), In Claim 6, delete "ΔCSI." and insert -- $\Delta_{CSI}$. --.

In Column 23, In Line 35 (Approx.), In Claim 7, delete "a" and insert -- $\alpha$ --.

In Column 23, In Line 42 (Approx.), In Claim 7, delete "ΔCSI." and insert -- $\Delta_{CSI}$. --.

In Column 23, In Line 45 (Approx.), In Claim 8, delete "value o" and insert -- value of --.

In Column 23, In Line 57, In Claim 9, delete "ρ(Δ$_{CSI}$)" and insert -- $\rho(\Delta_{CSI}))$ --.

Signed and Sealed this
Twenty-ninth Day of July, 2025

Coke Morgan Stewart
*Acting Director of the United States Patent and Trademark Office*